(12) United States Patent
Yumiki et al.

(10) Patent No.: US 8,023,813 B2
(45) Date of Patent: *Sep. 20, 2011

(54) COLLAPSIBLE LENS BARREL AND OPTICAL INSTRUMENT USING THE SAME

(75) Inventors: Naoto Yumiki, Hirakata (JP); Yutaka Takahashi, Hirakata (JP)

(73) Assignee: Panasonic Corporation, Osaka (JP)

( * ) Notice: Subject to any disclaimer, the term of this patent is extended or adjusted under 35 U.S.C. 154(b) by 68 days.

This patent is subject to a terminal disclaimer.

(21) Appl. No.: 12/370,366

(22) Filed: Feb. 12, 2009

(65) Prior Publication Data

US 2009/0237794 A1   Sep. 24, 2009

Related U.S. Application Data

(60) Division of application No. 11/978,429, filed on Oct. 29, 2007, now Pat. No. 7,653,295, which is a continuation of application No. 10/528,977, filed as application No. PCT/JP03/12116 on Sep. 22, 2003, now Pat. No. 7,308,195.

(30) Foreign Application Priority Data

Sep. 30, 2002 (JP) ................................. 2002-287605
Sep. 30, 2002 (JP) ................................. 2002-287606
Sep. 30, 2002 (JP) ................................. 2002-287607
Sep. 30, 2002 (JP) ................................. 2002-287608

(51) Int. Cl.
*G03B 17/00* (2006.01)

(52) U.S. Cl. .......................................... 396/75; 359/699

(58) Field of Classification Search .................... 396/72, 396/75, 87, 349, 55; 359/694, 696, 699–700
See application file for complete search history.

(56) References Cited

U.S. PATENT DOCUMENTS

| | | |
|---|---|---|
| 5,680,251 A | 10/1997 | Kato et al. |
| 5,826,118 A | 10/1998 | Koga et al. |
| 5,950,021 A | 9/1999 | Suzuki et al. |
| 5,956,187 A | 9/1999 | Dai Shintani |
| 6,049,432 A | 4/2000 | Machida et al. |
| 6,295,412 B1 | 9/2001 | Katano et al. |
| 6,330,396 B1 | 12/2001 | Boyd et al. |
| 6,434,331 B1 | 8/2002 | Araoka et al. |

(Continued)

FOREIGN PATENT DOCUMENTS

CN   1326103   12/2001

(Continued)

*Primary Examiner* — Christopher Mahoney
(74) *Attorney, Agent, or Firm* — Hamre, Schumann, Mueller & Larson, P.C.

(57) ABSTRACT

A collapsible lens barrel includes a first holding frame (2) for holding a first lens group (L1), a second holding frame (5) for holding a second lens group (L2) that is disposed on an image plane side with respect to the first lens group (L1), an actuator (6) for moving the second holding frame 5 in an optical axis direction, and a tubular cam frame (17) including a plurality of cam grooves that are formed at substantially equal intervals around a circumferential direction for moving the first holding frame (2) in the optical axis direction. The actuator (6) is attached to a portion in the cam frame (17) where the cam grooves are not formed. The first lens group (L1) is moved using the cam grooves, and the second lens group (L2) is moved using the actuator (6), so that a faster zooming speed and a lower zooming noise can be achieved.

5 Claims, 33 Drawing Sheets

U.S. PATENT DOCUMENTS

| | | |
|---|---|---|
| 6,473,567 B1 | 10/2002 | Nakashima |
| 6,657,793 B2 | 12/2003 | Nomura et al. |
| 7,019,915 B2 | 3/2006 | Sakamoto |
| 7,308,195 B2 * | 12/2007 | Yumiki et al. ............ 396/75 |
| 7,653,295 B2 | 1/2010 | Yumiki et al. |
| 2003/0025824 A1 | 2/2003 | Ishikawa |
| 2005/0041137 A1 | 2/2005 | Ezawa et al. |

FOREIGN PATENT DOCUMENTS

| | | |
|---|---|---|
| JP | 1-277810 | 11/1989 |
| JP | 2-195313 | 8/1990 |
| JP | 4-63307 | 2/1992 |
| JP | 5-88068 | 4/1993 |
| JP | 7-218809 | 8/1995 |
| JP | 8-43901 | 2/1996 |
| JP | 8-94905 | 4/1996 |
| JP | 8-327868 | 12/1996 |
| JP | 9-203842 | 8/1997 |
| JP | 10-197775 | 7/1998 |
| JP | 11-38304 | 2/1999 |
| JP | 11-211966 | 8/1999 |
| JP | 2000-180693 | 6/2000 |
| JP | 2000-330155 | 11/2000 |
| JP | 2001-42404 | 2/2001 |
| JP | 2001-108885 | 4/2001 |
| JP | 2001-117129 | 4/2001 |
| JP | 2001-208953 | 8/2001 |
| JP | 2002-107598 | 4/2002 |
| JP | 2002-107602 | 4/2002 |
| JP | 2002-236248 | 8/2002 |
| JP | 2002-281372 | 9/2002 |
| JP | 11-261904 | 9/2009 |

* cited by examiner

US 8,023,813 B2

COLLAPSIBLE LENS BARREL AND OPTICAL INSTRUMENT USING THE SAME

CROSS-REFERENCE TO RELATED APPLICATIONS

This application is a Division of application Ser. No. 11/978,429 filed Oct. 29, 2007, which is a Continuation of application Ser. No. 10/528,977, filed Mar. 22, 2005, which is a U.S. National Stage application of PCT/JP2003/012116, filed Sep. 22, 2003, which applications are incorporated herein by reference.

TECHNICAL FIELD

The present invention relates to a collapsible lens barrel for high-factor zooming. In particular, the present invention relates to a collapsible lens barrel capable of improving a zoom operability, miniaturizing a lens barrel and reducing an entire length of the lens barrel while maintaining its optical performance. Also, the present invention relates to an optical instrument using such a collapsible lens barrel.

BACKGROUND ART

In recent years, the use of a digital still camera (in the following, referred to as DSC) allowing a user to check a captured image immediately has been expanding rapidly. As a lens barrel for this DSC, a so-called collapsible lens barrel, which can be made shorter when not in use, generally is adopted in view of its portability when not in use.

FIG. 35 is an exploded perspective view showing a conventional collapsible lens barrel (see JP 2002-107598 A, for example). This collapsible lens barrel 60 is an optical system in which a single cam barrel 61 moves moving lens frames 62 and 63 back and forth so as to change a focal length. The inner peripheral surface of this cam barrel 61 is provided with cam grooves 64 and 65, which determine moving paths of the moving lens frames 62 and 63, respectively. Three cam pins 62a provided on the outer peripheral surface of the moving lens frame 62 and three cam pins 63a provided on the outer peripheral surface of the moving lens frame 63 mate with the cam grooves 64 and 65, respectively, whereby the moving lens frames 62 and 63 move in an optical axis (Z-axis) direction. The cam barrel 61 is provided outside a fixed barrel 70 and can rotate freely around the optical axis. An outer periphery of the cam barrel 61 is provided with a gear 66, which engages with a driving force transmitting gear 67. The driving force transmitting gear 67 is connected to an output axis of a cam barrel driving actuator 69 via a reduction gear train 68. Thus, when the cam barrel driving actuator 69 is driven, the driving force is transmitted via the reduction gear train 68 to the driving force transmitting gear 67, thereby rotating the cam barrel 61. This moves the moving lens frames 62 and 63 along respective shapes of the cam grooves 64 and 65, so that zooming is carried out from a collapsed state via a wide angle end.

FIG. 36 is a development showing the cam grooves 64 and 65 formed on the inner peripheral surface of the cam barrel 61. As shown in FIG. 36, the cam grooves 64 and 65 are formed in a circumferential direction of the cam barrel 61 so as to extend from a collapsed position through a wide angle end position to a telephoto end position. Accordingly, when the power of DSC is turned on, the moving lens frames 62 and 63 shift from the collapsed position to the wide angle end position, which is the next stop position, and stop there for an image capturing.

Further, with an increase in the optical zooming factor, the influence of camera shake has become conspicuous. In order to reduce this influence, a DSC including an image blurring correcting device is on its way to becoming commercialized. As this image blurring correcting device for DSC, there has been a suggested method of moving a correcting lens group in two directions that are perpendicular to the optical axis so as to correct the camera shake by a user, thereby obtaining a stable image (see JP 2001-117129 A, for example).

However, in the conventional collapsible lens barrel described above, since the reduction gear train 68 and the cam frame (cam barrel 61) are used for zooming, there have been problems in that an increase in a zoom speed and a reduction in a zoom noise are difficult to achieve.

DISCLOSURE OF INVENTION

Accordingly, the object of the present invention is to provide a collapsible lens barrel capable of increasing the zoom speed and reducing the zoom noise while being ready for a high zooming factor. Further, the object of the present invention is to provide an optical instrument including such a collapsible lens barrel.

In order to achieve the above-mentioned objects, a collapsible lens barrel according to the present invention includes a first holding frame for holding a first lens group, a second holding frame for holding a second lens group that is disposed on an image plane side with respect to the first lens group, an actuator for moving the second holding frame in an optical axis direction, and a tubular cam frame including a plurality of cam grooves that are formed at substantially equal intervals around a circumferential direction for moving the first holding frame in the optical axis direction. The actuator is attached to a portion in the cam frame where the cam grooves are not formed.

A first optical instrument according to the present invention is an optical instrument to which the above-described collapsible lens barrel according to the present invention is attached, and includes a storing system capable of storing an optical zooming factor at a time of turning off a power as an initial optical zooming factor information. In the case where the initial optical zooming factor information is stored in the storing system, the second lens group is moved to and stopped at an optical zooming factor position based on the initial optical zooming factor information when the power is turned on.

Further, a second optical instrument according to the present invention is an optical instrument to which the above-described collapsible lens barrel according to the present invention is attached, and includes an input system for inputting an optical zooming factor at a time of turning on a power, and a storing system for storing the optical zooming factor inputted from the input system as an initial optical zooming factor information. In the case where the initial optical zooming factor information is stored in the storing system, the second lens group is moved to and stopped at an optical zooming factor position based on the initial optical zooming factor information when the power is turned on.

BEST MODE FOR CARRYING OUT THE INVENTION

Figure 1:
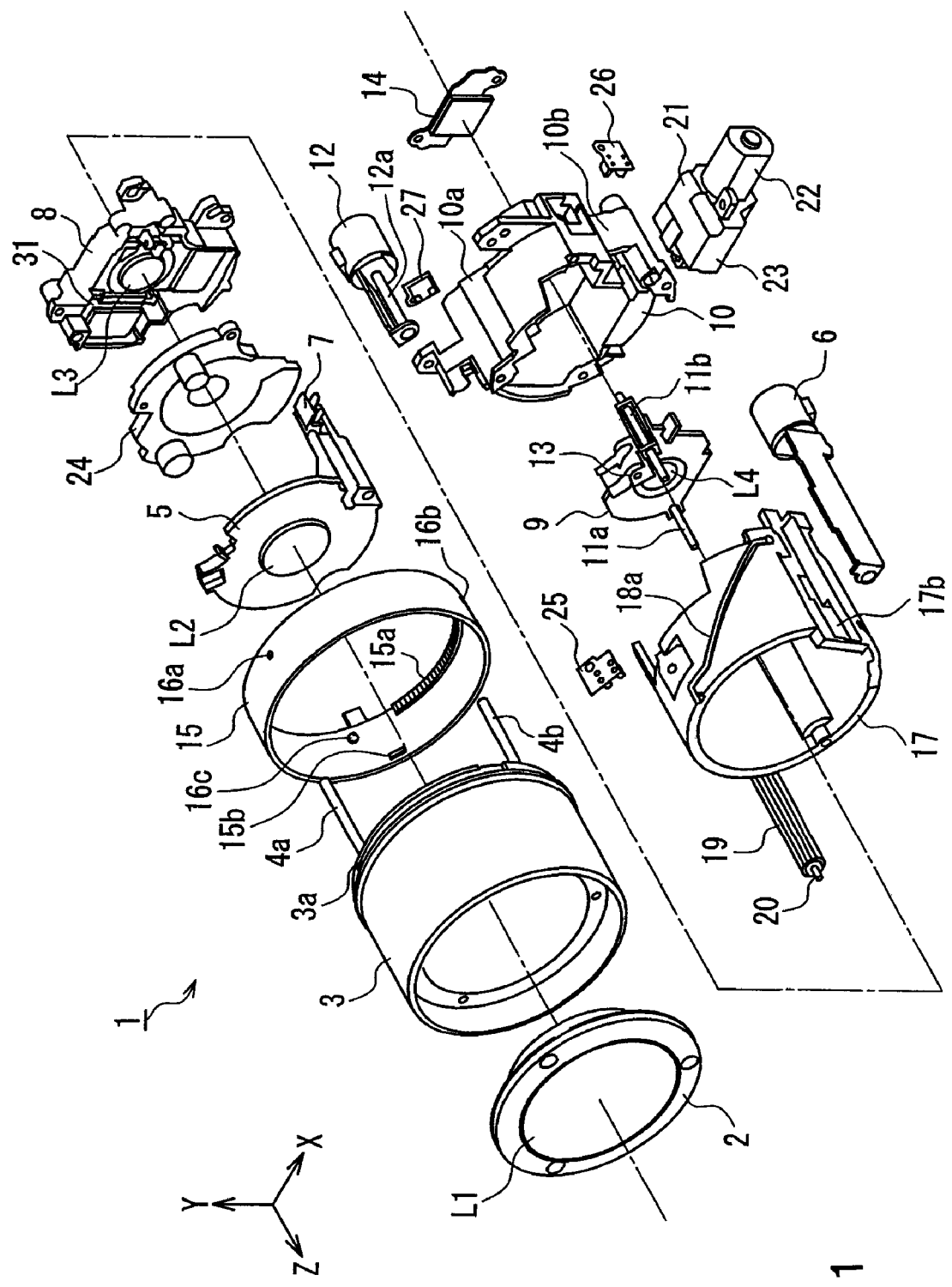
FIG. 1 is an exploded perspective view showing a collapsible lens barrel according to a first embodiment of the present invention.

A collapsible lens barrel according to the present invention includes a first holding frame for holding a first lens group, a second holding frame for holding a second lens group that is disposed on an image plane side with respect to the first lens group, an actuator for moving the second holding frame in an optical axis direction, and a tubular cam frame including a plurality of cam grooves that are formed at substantially equal intervals around a circumferential direction for moving the first holding frame in the optical axis direction. The actuator is attached to a portion in the cam frame where the cam grooves are not formed.

In accordance with the collapsible lens barrel of the present invention described above, the first lens group is driven via the cam grooves, and the second lens group is driven via the actuator. Since the first lens group and the second lens group are driven separately in this manner, the first lens group does not have to be driven when driving the second lens group for zooming. Therefore, it is possible to achieve a collapsible lens barrel capable of increasing the zoom speed and reducing the zoom noise. Accordingly, a user can change the angle of view instantly, making it possible to chase a subject, capture a moving image, etc., which have been difficult in conventional DSCs.

Further, since the actuator for driving the second lens group is provided on the cam frame without interfering with the plurality of cam grooves, it is possible to reduce the number of components thanks to a high-density mounting, reduce the diameter of the lens barrel, simplify the configuration and lower costs.

The above-described collapsible lens barrel according to the present invention further may have a detecting member for detecting a position of the second holding frame, a substantially hollow cylindrical driving frame that is rotatable around an optical axis and moves together with the first holding frame in the optical axis direction, and a driving gear for rotating the driving frame. In this case, it is preferable that the cam grooves mate with the driving frame, and the driving frame moves in the optical axis direction along the cam grooves with a rotation of the driving frame. It also is preferable that the detecting member and the driving gear respectively are attached to the portion in the cam frame where the cam grooves are not formed.

With this preferable mode, since the position detecting member for the second lens group and the driving gear for rotating the driving frame are provided on the cam frame without interfering with the plurality of cam grooves, it is possible to reduce the number of components thanks to a high-density mounting, reduce the diameter of the lens barrel, simplify the configuration and lower costs.

In the above-described collapsible lens barrel according to the present invention, it is preferable that the cam frame is molded out of a resin by using a molding die, which is a combination of a plurality of molding die parts, and at least one of the plurality of cam grooves formed on the cam frame and at least one of mounting portions of the actuator, the detecting member and the driving gear are molded with a common molding die part.

With this preferable mode, since the number of molding die parts for resin-molding can be reduced, it is possible to reduce the costs of the molding die and thus lower the costs of the lens barrel.

The above-described collapsible lens barrel according to the present invention further may have at least two rod-like guide members parallel with each other whose one end is fixed to the first holding frame. In this case, it is preferable that the second holding frame is held sidably by the guide members.

With this preferable mode, when the first lens group tilts with respect to the optical axis, the second lens group also tilts in the same direction. Accordingly, the reduction of optical performance can be suppressed.

In this case, the collapsible lens barrel according to the present invention further may have an image blurring correcting member for holding a third lens group for correcting image blurring disposed on the image plane side with respect to the second holding frame. In this case, it is preferable that the guide members are supported in such a manner as to be slidable with respect to the image blurring correcting member substantially in parallel with the optical axis.

With this preferable mode, the directions in which the first and second lens groups tilt with respect to the third lens group for correcting image blurring which have the greatest influence on the optical performance, can be aligned, thereby suppressing the reduction of optical performance further.

Also, it is preferable that each of the guide members is fixed to the first holding frame by being press-fitted into two through holes penetrating in the optical axis direction that are spaced from each other.

With this preferable mode, it is easy to adjust the degree of parallelization of the guide members with respect to the optical axis, so that the guide members can be fixed in parallel with the optical axis. Also, the number of assembling steps can be reduced compared with the conventional system of pre-fixing the guide member with a jig intended for this purpose and adhering it.

In the above-described collapsible lens barrel according to the present invention, it is preferable that a gap is provided between the first lens group and the first holding frame in a direction perpendicular to an optical axis, and the first lens group and the first holding frame move toward the image plane side and a front end of the actuator enters the gap at a time of non-capturing.

With this preferable mode, the entire length of a collapsed lens barrel can be reduced without increasing the diameter of the lens barrel.

The above-described collapsible lens barrel according to the present invention further may have a substantially hollow cylindrical driving frame that rotates around an optical axis relative to the cam frame, thereby moving together with the first holding frame in the optical axis direction. In this case, it is preferable that the driving frame includes mating members for mating with the cam grooves, and wide portions whose width along the optical axis direction is increased are formed in the cam grooves so that the mating members do not contact the cam grooves when the first lens group is moved furthest to the image plane side.

With this preferable mode, even when a compression load in the optical axis direction is applied in a collapsed state, the mating members do not contact the cam grooves. Therefore, it is possible to prevent damage to the lens barrel such as the deformation of the mating members or the damage to the cam grooves.

It is preferable that the above-described collapsible lens barrel according to the present invention further includes a detecting member disposed for detecting an absolute position of the second holding frame in the optical axis direction when the second holding frame is at a position furthest to the image plane side or in the vicinity thereof.

With this preferable mode, since the zooming position information after turning on the power can be detected and initialized instantly, it is possible to shorten the time required for shifting to the next zooming position.

Here, it is preferable that the position furthest to the image plane side substantially is a telephoto end position in an optical system.

With this preferable mode, the zooming position after turning on the power can be shifted instantly to the vicinity of the telephoto end position not through the wide angle end. This allows a user to scale up an image without missing an important shutter chance.

Also, the image blurring correcting member may include a pair of actuators for driving the third lens group in two directions perpendicular to the optical axis. In this case, it is preferable that the driving gear for rotating the driving frame is disposed between the pair of actuators.

With this preferable mode, since the driving gear is provided between the pair of actuators for correcting image blurring, it becomes possible to bring the driving gear toward the center of the optical axis without causing interference with the cam grooves. Consequently, the diameter of the lens barrel can be reduced.

The above-described collapsible lens barrel according to the present invention further may include a shutter unit between the image blurring correcting member and the second holding frame. In this case, it is preferable that the shutter unit includes a driving actuator on its surface on the side of the second holding frame, and the second holding frame is provided with a recessed portion that the driving actuator partially enters.

With this preferable mode, it is possible to reduce the clearance between the shutter unit and the second holding frame, thereby shortening the entire length of the collapsible lens barrel.

Although there is no particular limitation on a method for assembling the above-described collapsible lens barrel according to the present invention, this collapsible lens barrel can be assembled as follows, for example. That is, the method may include a first assembling step of assembling the first holding frame and the driving frame, a second assembling step of assembling the driving frame and the cam frame while allowing the mating members and the cam grooves to mate with each other, a third assembling step of moving the mating members of the driving frame to the wide portions of the cam grooves and a fourth assembling step of fixing a fixing frame to the cam frame. Here, the fixing frame is a frame on which a driving means for moving the first holding frame in the optical axis direction is mounted, though no driving means need be mounted yet in the fourth assembling step. In addition, all of the first to fourth assembling steps are carried out from the same direction.

With this method for assembling a collapsible lens barrel, since all the components are installed from the same direction, it is possible to reduce the number of assembling steps and lower the cost of the lens barrel.

Also, since the fourth assembling step fixes the fixing frame to the cam frame while the mating members are already moved to the wide portions of the cam grooves, the mating members and the cam grooves do not contact each other even when a compression load in the optical axis direction is applied to the barrel in the fourth assembling step, and problems such as deformation of the mating members or damages to the cam grooves are not caused.

Next, a first optical instrument according to the present invention is an optical instrument to which the above-described collapsible lens barrel according to the present invention is attached, and includes a storing system capable of storing an optical zooming factor at a time of turning off a power as an initial optical zooming factor information. In the case where the initial optical zooming factor information is stored in the storing system, the second lens group is moved to and stopped at an optical zooming factor position based on the initial optical zooming factor information when the power is turned on.

With this first optical instrument, when the power is turned off, a set value of the last zooming position used is stored automatically. Thus, the next time the power is turned on, it is possible to start capturing images at the same angle of view.

Further, a second optical instrument according to the present invention is an optical instrument to which the above-described collapsible lens barrel according to the present invention is attached, and includes an input system for inputting an optical zooming factor at a time of turning on a power, and a storing system for storing the optical zooming factor inputted from the input system as an initial optical zooming factor information. In the case where the initial optical zooming factor information is stored in the storing system, the second lens group is moved to and stopped at an optical zooming factor position based on the initial optical zooming factor information when the power is turned on.

With this second optical instrument, since the zooming factor at the time of turning on the power can be set freely by a user, it becomes possible to change the zooming factor depending on the scene or situation of image capturing. Consequently, it is less likely that a problem of missing a shutter chance is caused.

The following is a description of the present invention with reference to specific embodiments. However, the present invention is not limited to the embodiments described below.

First Embodiment

In the following, a collapsible lens barrel according to the first embodiment of the present invention will be described, with reference to FIGS. 1 to 26.

As shown in FIG. 1, an XYZ three-dimensional rectangular coordinate system is set, with an optical axis of a collapsible lens barrel 1 being a Z axis (an object side being a positive side). L1 denotes a first group lens, L2 denotes a second group lens that moves along an optical axis (Z axis) for zooming, L3 denotes a third group lens for correcting an image blurring, and L4 denotes a fourth group lens that moves along the optical axis for correcting an image plane fluctuation caused by zooming and for achieving focus.

A first group holding frame 2 holds the first group lens L1 and is fixed to a tubular first group moving frame 3 with a screw or the like such that a center axis of the first group lens L1 is parallel with the optical axis. One end of each of two guide poles (guide members) 4a and 4b parallel to the optical axis is fixed to this first group moving frame 3. How to fix these guide poles 4 will be described later.

A second group moving frame 5 holds the second group lens L2 and is supported by the above-mentioned two guide poles 4a and 4b so as to be slidable in the optical axis direction. Further, a feed screw 6a of a second group lens driving actuator 6 such as a stepping motor and a screw portion of a rack 7 provided in the second group moving frame 5 engage with each other, whereby the driving force of the second group lens driving actuator 6 causes the second group moving frame 5 to move in the optical axis direction for zooming.

A third group frame 8 holds an image blurring correcting lens group L3 (a third group lens) and constitutes an image blurring correcting device 31, which will be described later.

A fourth group moving frame 9 is supported by two guide poles 11a and 11b that are parallel with the optical axis and interposed between the third group frame 8 and a master flange 10, so that the fourth group moving frame 9 is slidable in the optical direction. Moreover, a feed screw 12a of a fourth group lens driving actuator 12 such as a stepping motor and a screw portion of a rack 13 provided in the fourth group moving frame 9 engage with each other, whereby the driving force of the fourth group lens driving actuator 12 causes the fourth group moving frame 9 to move in the optical axis direction for correcting the image plane fluctuation due to zooming and for achieving focus.

An imaging element (CCD) 14 is attached to the master flange 10.

Figure 2A:
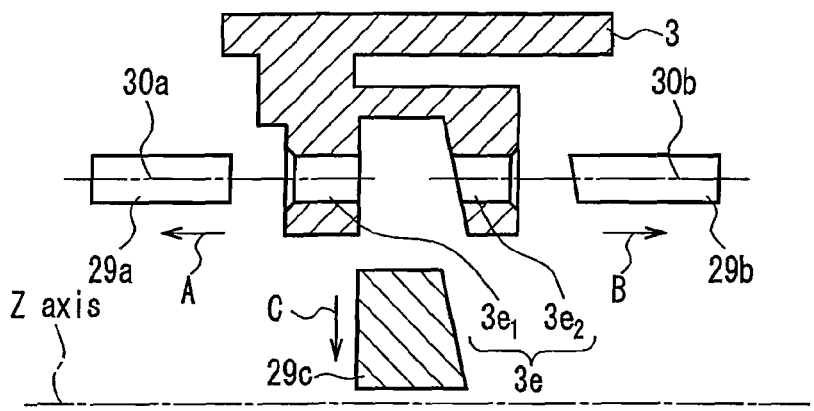
FIG. 2A is a half sectional view showing how to mold a fixing portion in a first group moving frame for fixing a guide pole in the collapsible lens barrel according to the first embodiment of the present invention.
Figure 2B:
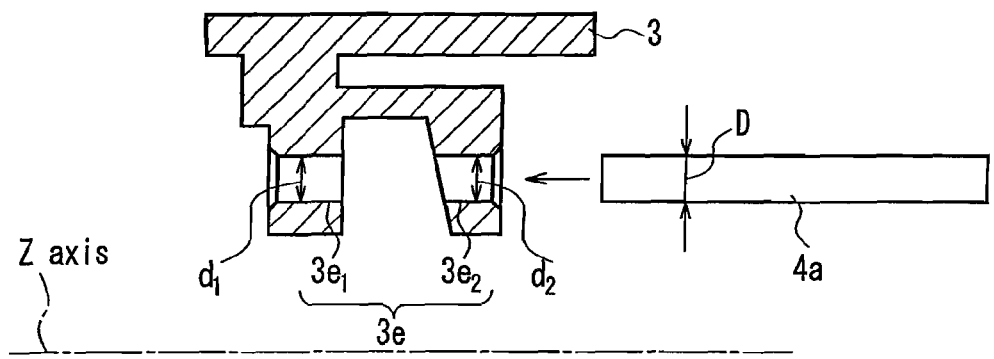
FIG. 2B is a half sectional view showing how the guide pole is press fitted and fixed into the fixing portion formed in the first group moving frame in the collapsible lens barrel according to the first embodiment of the present invention.
Figure 2C:
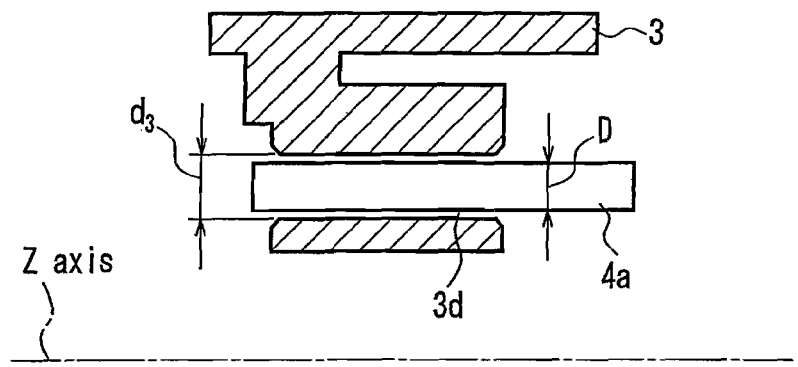
FIG. 2C is a half sectional view showing how to fix a conventional guide pole.

Herein, how to fix the guide poles 4a and 4b to the first group moving frame 3 will be described referring to FIGS. 2A to 2C. Each of FIGS. 2A to 2C is a half sectional view showing one side alone with respect to the Z axis. Although the following description is directed to how to fix the guide pole 4a on one side with respect to the Z axis to a fixing portion 3e, the same applies to the case of fixing the guide pole 4b on the other side to the fixing portion.

FIG. 2A is a half sectional view showing a method for molding out of a resin the fixing portion 3e for fixing one end of the guide pole 4a. As shown in FIG. 2A, the fixing portion 3e for fixing one end of the guide pole 4a is formed on an inner surface of the first group moving frame 3 by molding. The fixing portion 3e substantially is parallel with the Z axis and formed of through holes $3e_1$ and $3e_2$ that are spaced from each other. These through holes $3e_1$ and $3e_2$ are molded out of a resin using three molding dies 29a, 29b and 29c. The resin-molding is performed while keeping the columnar molding dies 29a and 29b in contact with both lateral surfaces of the molding die 29c having a substantially trapezoidal cross-section. Thereafter, the columnar molding dies 29a and 29b are pulled out in opposite directions A and B that are substantially parallel with the Z axis and the substantially trapezoidal molding die 29c is pulled out in a direction C approaching the Z axis, thereby obtaining the through holes $3e_1$ and $3e_2$. At this time, the positions of the columnar molding dies 29a and 29b within a plane perpendicular to the Z axis are adjusted so that the guide pole 4a may be fixed in parallel with the Z axis when it is press-fitted into the through holes $3e_1$ and $3e_2$.

Subsequently, as shown in FIG. 2B, the guide pole 4a is press-fitted into the through holes $3e_1$ and $3e_2$ from the right side of the figure (the side of the imaging element 14). Although inner diameters $d_1$ and $d_2$ of the through holes $3e_1$ and $3e_2$ are set to be larger than an outer diameter D of the guide pole 4a by several micrometers, the guide pole 4a is fixed firmly by the two through holes $3e_1$ and $3e_2$ owing to a relative displacement or tilt of center axes 30a and 30b of the columnar molding dies 29a and 29b (see FIG. 2A) within the plane perpendicular to the Z axis. In this manner, the guide pole 4a is fixed to the first group moving frame 3 so as to be parallel with the Z axis.

FIG. 2C is a half sectional view showing a conventional method for fixing the guide pole 4a. The conventional fixing method is as follows. First, a fixing portion 3d formed of a single continuous through hole having an inner diameter $d_3$ that is sufficiently larger than the outer diameter D of the guide pole 4a is molded out of a resin. Next, the guide pole 4a is inserted into the fixing portion 3d, pre-fixed with a jig intended for this purpose and fixed by filling an adhesive between the guide pole 4a and the fixing portion 3d.

As described above, in the method for fixing the guide pole according to the present embodiment, the guide pole 4a can be fixed in parallel with the Z axis simply by press-fitting the guide pole 4a into the through holes $3e_1$ and $3e_2$. Thus, unlike the conventional case, there is no need for a jig specifically for pre-fixing the guide pole 4a or an adhesive. Also, time and trouble in curing the adhesive are not needed. Consequently, it is possible to fix the guide pole 4a at a low cost and within a short time. Furthermore, simply by adjusting the positions of the molding dies 29a and 29b within the plane perpendicular to the Z axis, the guide pole 4a can be fixed precisely in parallel with the Z axis.

Figure 3:
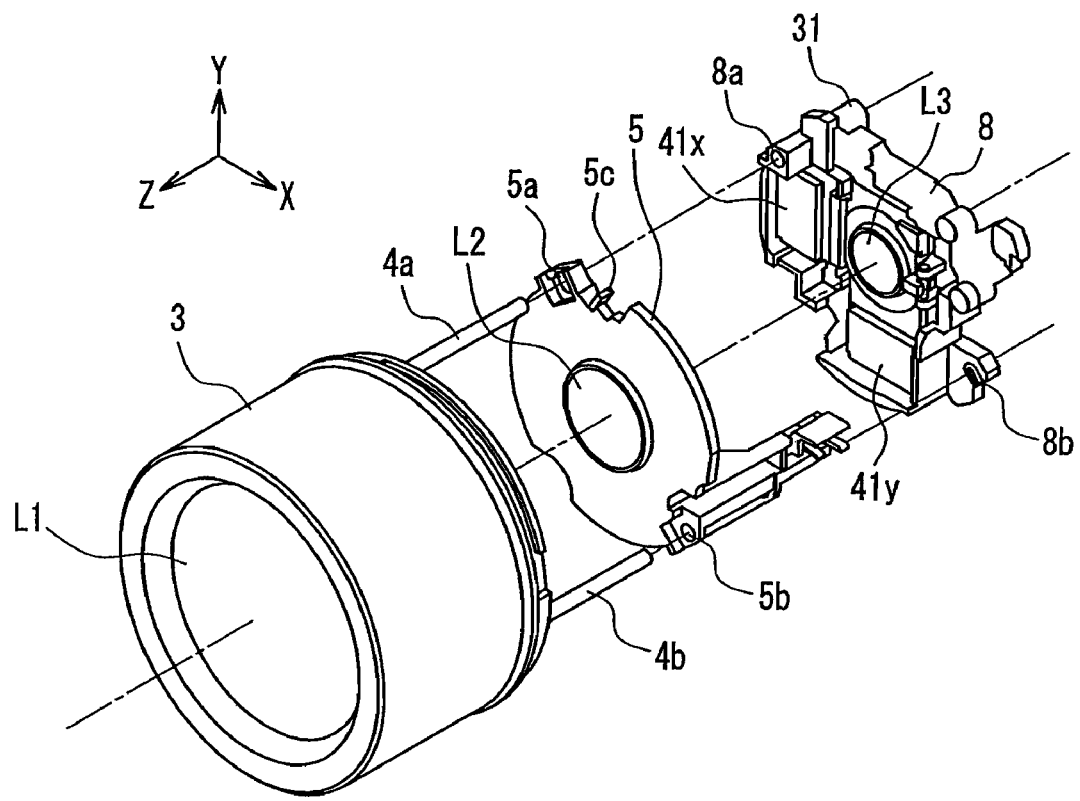
FIG. 3 is an exploded perspective view for describing guide pole supporting portions in the collapsible lens barrel according to the first embodiment of the present invention.

Next, how to support the guide poles 4a and 4b will be described referring to FIG. 3.

The third group frame 8 is provided with a supporting portion 8a (on a main axis side) and a supporting portion 8b (on a rotation stopper side). The guide poles 4a and 4b penetrate through the supporting portions 8a and 8b, so that they are held in parallel with the optical axis. Since the guide poles 4a and 4b slide in the optical axis direction with respect to these two supporting portions 8a and 8b, the first group lens L1 held by the first group moving frame 3 fixed to one end of each of the guide poles 4a and 4b maintains its precision with respect to the image blurring correcting lens L3 provided in the third group frame 8. Furthermore, the guide poles 4a and 4b slidably penetrate through a supporting portion 5a (on the rotation stopper side) and a supporting portion 5b (on the main axis side) that are provided in the second group moving frame 5, whereby the second group moving frame 5 is supported sidably in the optical axis direction by the guide poles 4a and 4b. Consequently, the second group lens L2 held by the second group moving frame 5 maintains its precision with respect to the image blurring correcting lens L3 provided in the third group frame 8.

Herein, the relationship among the first group lens L1, the second group lens L2 and the third group lens L3 mentioned above will be described referring to FIGS. 4A to 4C. In these figures, arrows L1a and L2a indicate directions of center axes of the first group lens L1 and the second group lens L2, respectively.

Figure 4A:
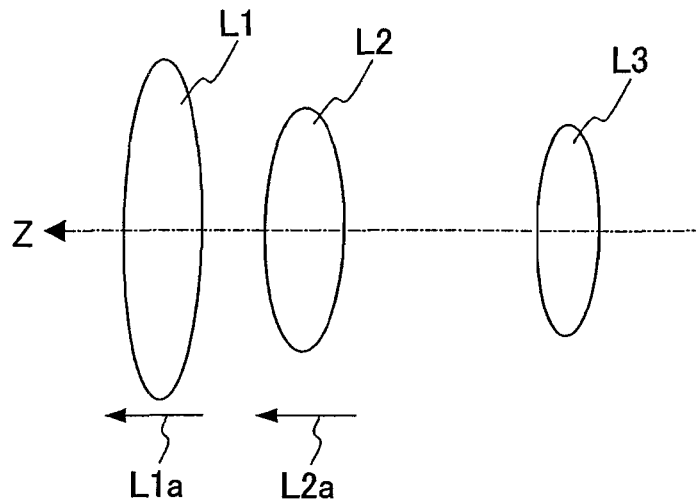
FIG. 4A shows a lens tilt in an ideal collapsible lens barrel.

FIG. 4A shows an ideal state of the three lens groups L1, L2 and L3, in which the center axis L1a of the first group lens L1 and the center axis L2a of the second group lens L2 are parallel with the Z axis (which is the optical axis of the lens barrel and corresponds to the center axis of the third group lens L3).

Figure 4B:
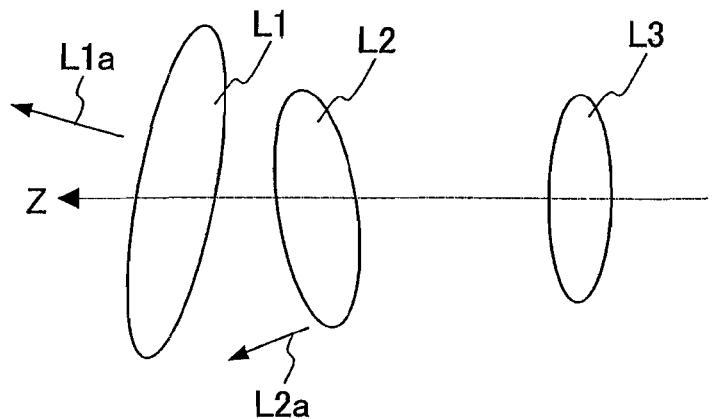
FIG. 4B shows a lens tilt in a conventional collapsible lens barrel.
Figure 35:
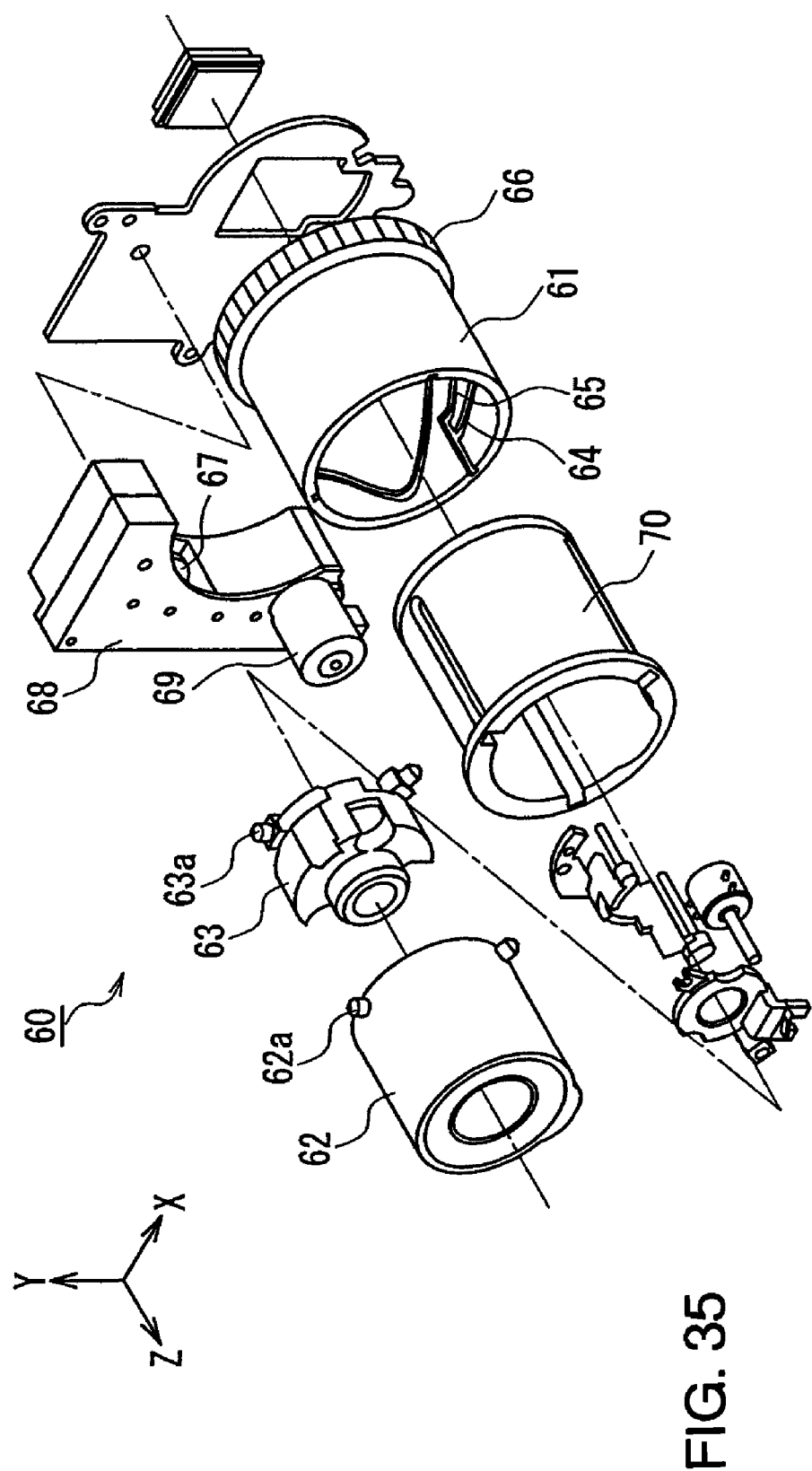
FIG. 35 is an exploded perspective view showing a conventional collapsible lens barrel.
Figure 36:
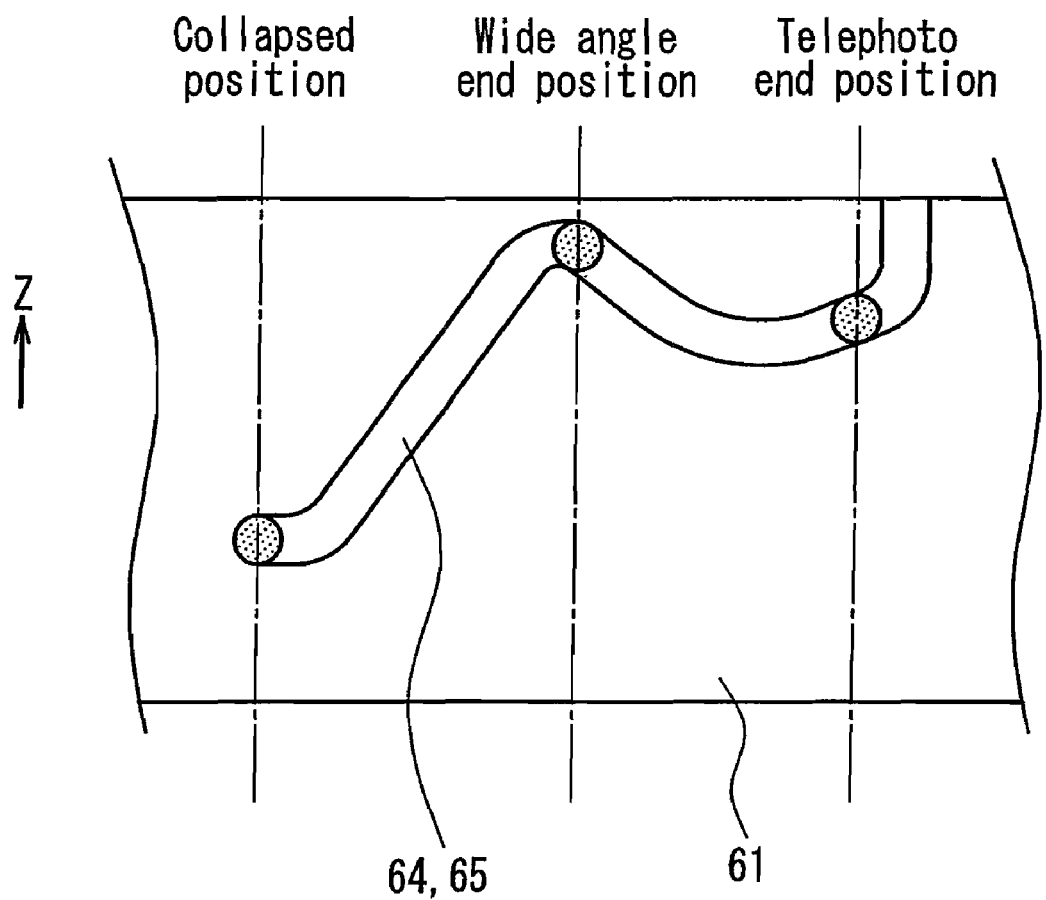
FIG. 36 is a development showing a cam groove formed on an inner peripheral surface of a cam barrel of the conventional collapsible lens barrel.

FIG. 4B shows the case in which the first group lens L1 and the second group lens L2 are supported respectively by the cam pin 62a provided in the moving lens frame 62 and the cam pin 63a provided in the moving lens frame 63 shown in FIG. 35 by a system similar to the conventional lens barrel shown in FIG. 35. In this case, because of a variation in precision of the cam pins 62a and 63a and the cam grooves 64 and 65, the center axis L1a of the first group lens L1 and the center axis L2a of the second group lens L2 are neither parallel with each other nor parallel with the Z axis. Thus, it is likely that the optical performance will deteriorate.

Figure 4C:
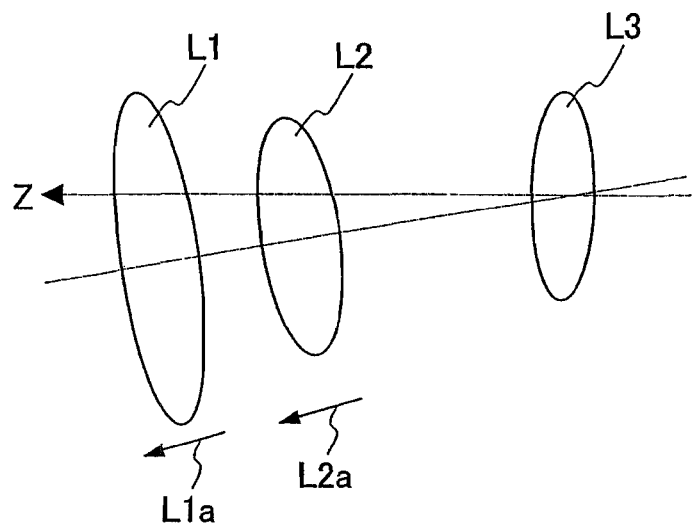
FIG. 4C shows a lens tilt in the collapsible lens barrel according to the first embodiment of the present invention.

FIG. 4C shows the case according to the present embodiment. The first group lens L1 and the second group lens L2 are supported by the same guide poles 4a and 4b. Therefore, even when the center axis L1a of the first group lens L1 and the center axis L2a of the second group lens L2 tilt with respect to the Z axis, the directions of these center axes L1a and L2a always coincide with each other. In other words, since the first group lens L1 and the second group lens L2 always tilt in the same direction with respect to the image blurring correcting lens group L3, which has the greatest influence on the optical performance, it is possible to minimize the deterioration of the optical performance.

Next, the configuration of moving the first group lens L1 in the optical axis direction will be described.

As shown in FIG. 1, a gear 15a is formed in a part of an inner peripheral surface of a substantially hollow cylindrical driving frame 15 on the side of the imaging element 14. Also, three protruding portions 15b are formed at substantially 120° intervals on the inner peripheral surface thereof on the object side (the positive side of the Z axis). The protruding portions 15b mate with three circumferential groove portions 3a provided in an outer peripheral surface of the first group moving frame 3 on the side of the imaging element 14, whereby the driving frame 15 can rotate relative to the first group moving frame 3 around the optical axis, and the driving frame 15 and the first group moving frame 3 move integrally in the optical axis direction. Furthermore, three cam pins 16a, 16b and 16c are press-fitted and fixed to the inner peripheral surface of the driving frame 15 at 120° intervals.

Figure 5:
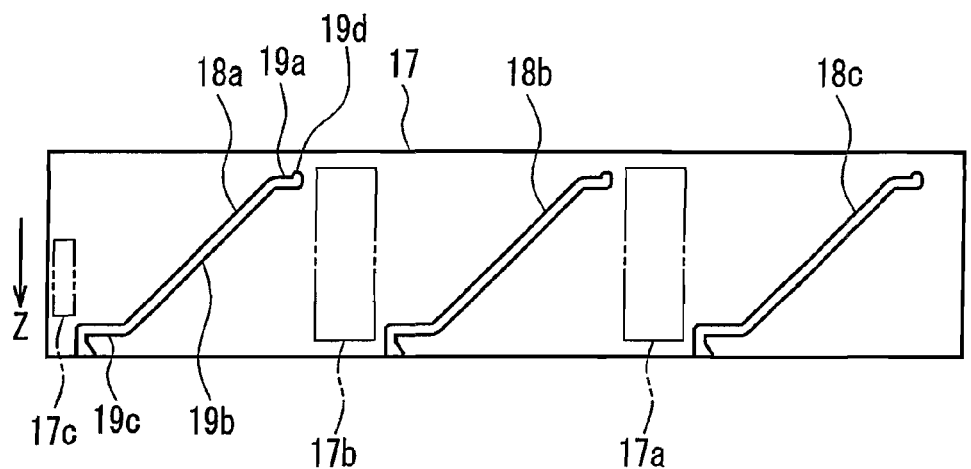
FIG. 5 is a development of cam grooves in the collapsible lens barrel according to the first embodiment of the present invention.

On an outer surface of a tubular cam frame 17, three cam grooves 18a, 18b and 18c are formed at substantially 120° intervals. FIG. 5 is a development of the outer peripheral surface of the cam frame 17. The cam pins 16a, 16b and 16c of the driving frame 15 mate with the cam grooves 18a, 18b and 18c of the cam frame 17, respectively. Each of the cam grooves 18a, 18b and 18c has a portion 19a that is substantially parallel with the circumferential direction of the cam frame 17 on the side of the imaging element 14 (the negative side of the Z axis), a portion 19c that is substantially parallel with the circumferential direction of the cam frame 17 on the object side (the positive side of the Z axis), a portion 19b that connects spirally the portion 19a and the portion 19c and a wide portion 19d whose width increases in the Z-axis direction at the end of the portion 19a. When the cam pins 16a, 16b and 16c are located in the portion 19a, the first group lens L1 stops while being retracted toward the side of the imaging element 14 (a collapsed state). From this state, the driving frame 15 rotates around the optical axis, so that the cam pins 16a, 16b and 16c move through the portion 19b and reach the portion 19c. When the cam pins 16a, 16b and 16c are located in the portion 19c, the first group lens L1 stops while being advanced toward the object side.

The cam grooves 18a, 18b and 18c are formed so as to have different widths along the optical axis direction depending on how far the driving frame 15 is advanced. This will be described referring to FIG. 6.

Figures 6A, 6B:
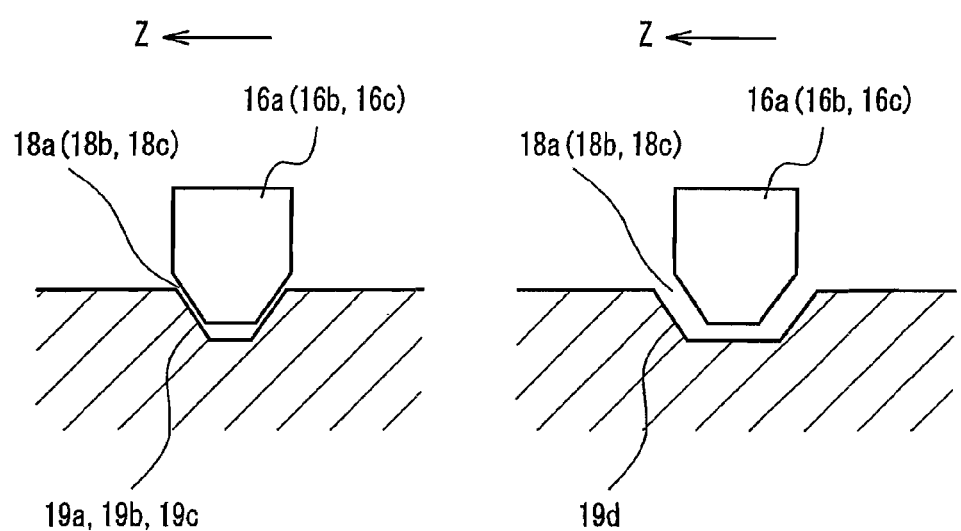
FIG. 6A is a partially sectional view taken in a plane parallel with an optical axis, showing how a cam pin and a cam groove mate with each other in the collapsible lens barrel according to the first embodiment of the present invention.
FIG. 6B is a partially sectional view taken in the plane parallel with the optical axis, showing how the cam pin and the cam groove mate with each other in a wide portion of the cam groove in the collapsible lens barrel according to the first embodiment of the present invention.

FIG. 6A is a partially sectional view taken in a direction parallel with the Z axis, showing the cam pins 16a, 16b and 16c and the cam grooves 18a, 18b and 18c in the portions 19a, 19b and 19c of the cam grooves 18a, 18b and 18c. As shown in the figure, in the portions 19a, 19b and 19c, the cam grooves 18a, 18b and 18c are formed to be about several micrometers wider than the cam pins 16a, 16b and 16c along the Z-axis direction. As a result, the cam pins 16a, 16b and 16c can slide smoothly in the cam grooves 18a, 18b and 18c.

FIG. 6B is a partially sectional view taken in the direction parallel with the Z axis, showing the cam pins 16a, 16b and 16c and the cam grooves 18a, 18b and 18c in the wide portions 19d of the cam grooves 18a, 18b and 18c. As shown in the figure, in the wide portions 19d, the cam grooves 18a, 18b and 18c are formed to be wider than the cam pins 16a, 16b and 16c along the Z-axis direction so that the cam pins 16a, 16b and 16c do not contact the cam grooves 18a, 18b and 18c in the Z-axis direction. As a result, in the state where the driving frame 15 is retracted furthest to the image plane side (the state in FIG. 22 described later), the cam pins 16a, 16b and 16c are located in the wide portions 19d and do not contact the cam grooves 18a, 18b and 18c as shown in FIG. 6B.

On the outer peripheral surface of the cam frame 17, a bearing portion 17d for holding driving gear shafts 20 at both ends of a spline-like driving gear 19 rotatably and a driving gear mounting portion (a recessed portion) 17a that is recessed in a hemicylindrical shape for avoiding an interference with the driving gear 19 are formed between the cam grooves 18b and 18c, whereby the driving gear 19 is held rotatably on the outer peripheral surface of the cam frame 17. The driving gear 19 transmits a driving force of a driving unit 21, which will be described later, mounted to the master flange 10 to a gear portion 15a provided in the driving frame 15. Accordingly, the rotation of the driving gear 19 causes the driving frame 15 to rotate around the optical axis. At this time, the cam pins 16a, 16b and 16c provided in the driving frame 15 move in the cam grooves 18a, 18b and 18c of the cam frame 17, whereby the driving frame 15 moves also in the optical axis direction. Here, since the two guide poles 4a and 4b fixed to the first group moving frame 3 penetrate through the supporting portions 8a and 8b of the third group frame 8, the rotation of the first group moving frame 3 around the optical axis is restricted, so that the first group moving frame 3 moves straight along the optical axis direction as the driving frame 15 moves along the optical axis direction.

The driving actuator 6 of the second group moving frame 5 is fixed to a mounting portion 17b of the cam frame 17. Also, the driving actuator 12 of the fourth group moving frame 9 is fixed to a mounting portion 10a of the master flange 10. The driving unit 21 for transmitting the driving force to the driving gear 19 includes a driving actuator 22 and a reduction gear unit 23 constituted by a plurality of gears and is fixed to a mounting portion 10b of the master flange 10.

A shutter unit 24 is constituted by a diaphragm blade and a shutter blade that form a constant aperture diameter for controlling an exposure amount and an exposure time of the imaging element 14.

Figure 7:
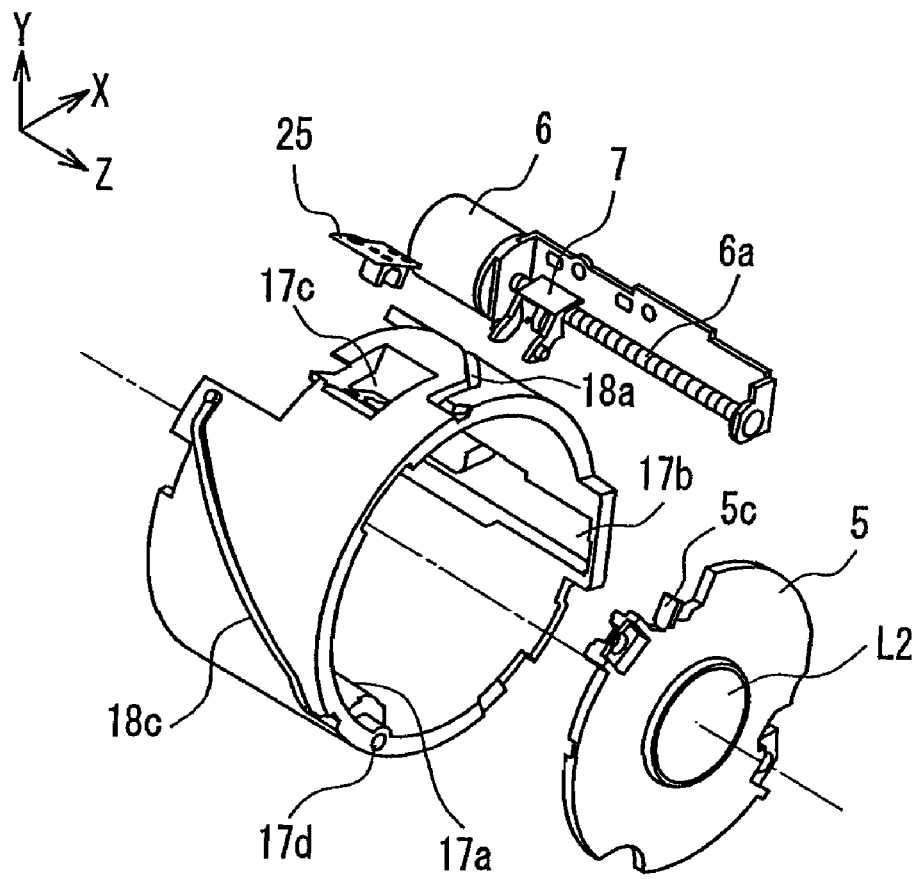
FIG. 7 is an exploded perspective view for describing a mounting position of a home position detecting sensor of a second group lens in the collapsible lens barrel according to the first embodiment of the present invention.

A home position detecting sensor 25 for the second group moving frame 5 is a photo-detector sensor including a light-emitting element and a light-receiving element and detects the position of the second group moving frame 5 in the optical axis direction, namely, a home position (an absolute position) of the second group lens L2. As shown in FIG. 7, this home position detecting sensor 25 is mounted onto an mounting portion 17c of the cam frame 17 and detects the home position as follows: when the second group moving frame 5 moves to the position furthest to the side of the imaging element 14 (a −Z direction side) or the vicinity thereof, a blade 5c provided in the second group moving frame 5 passes in front of the home position detecting sensor 25 and blocks light, thereby allowing the home position to be detected. When the home position is detected, the second group moving frame 5 and the rack 7 mounted thereto are located furthest to the side of the imaging element 14 and close to the driving motor 6. This state corresponds to that in FIG. 22 described later.

A home position detecting sensor 26 for the fourth group moving frame 9 detects the position of the fourth group moving frame 9 in the optical axis direction, namely, a home position of the fourth group lens L4. A home position detecting sensor 27 for the driving frame 15 detects the position of the driving frame 15 in a rotational direction, namely, home positions of the first group moving frame 3 and the first group lens L1 that move as one piece with the driving frame 15.

The image blurring correcting device 31 moves the image blurring correcting lens group L3 for correcting an image blurring at the time of image capturing in a pitching direction, which is a first direction (a Y direction) and a yawing direction, which is a second direction (an X direction). A first electromagnetic actuator 41y generates a driving force in the Y direction, and a second electromagnetic actuator 41x generates a driving force in the X direction, so that the image blurring correcting lens group L3 is driven. in the X and Y directions that. are substantially perpendicular to the optical axis Z.

Figure 8:
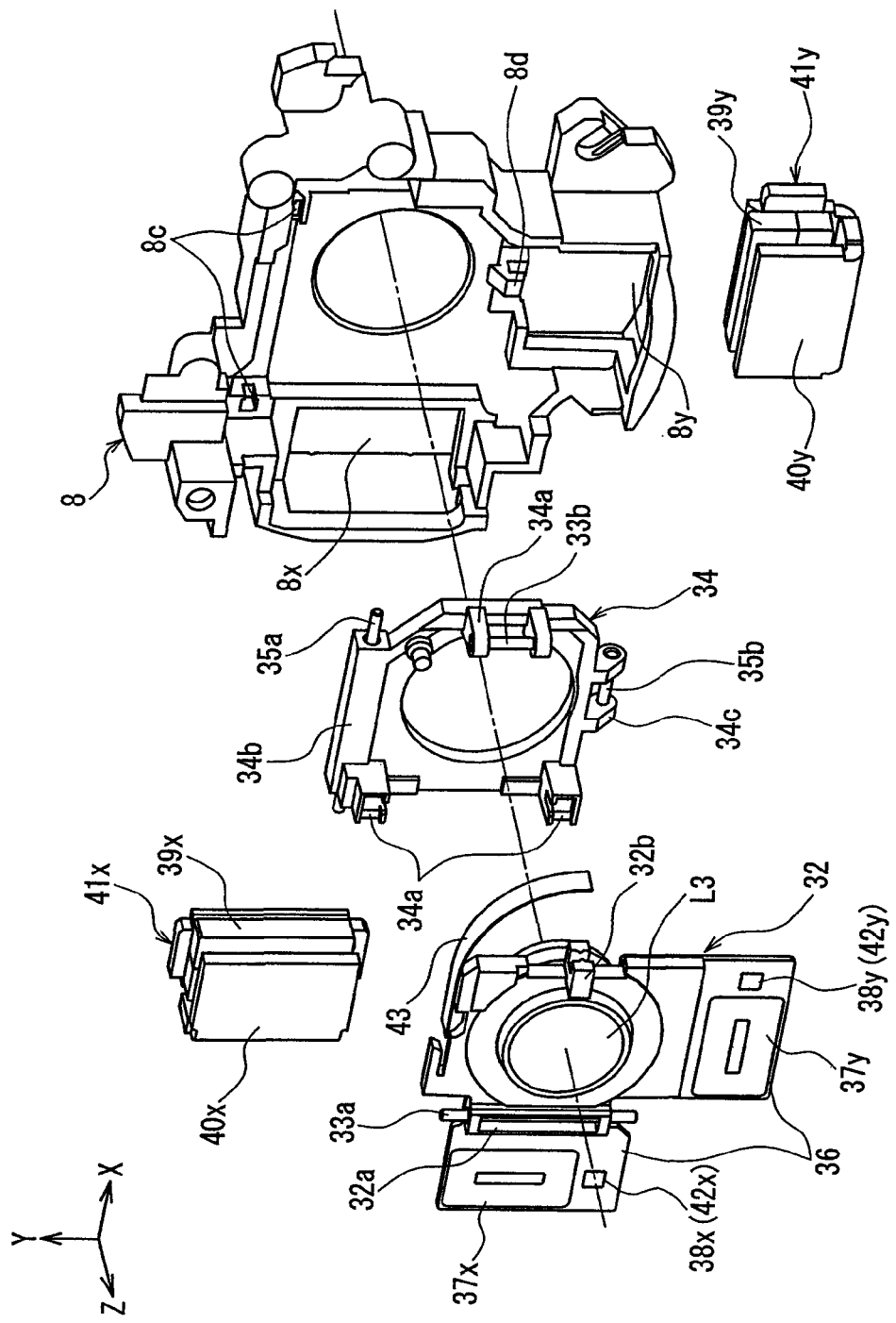
FIG. 8 is an exploded perspective view showing a configuration of an image blurring correcting device in the collapsible lens barrel according to the first embodiment of the present invention.
Figure 9:
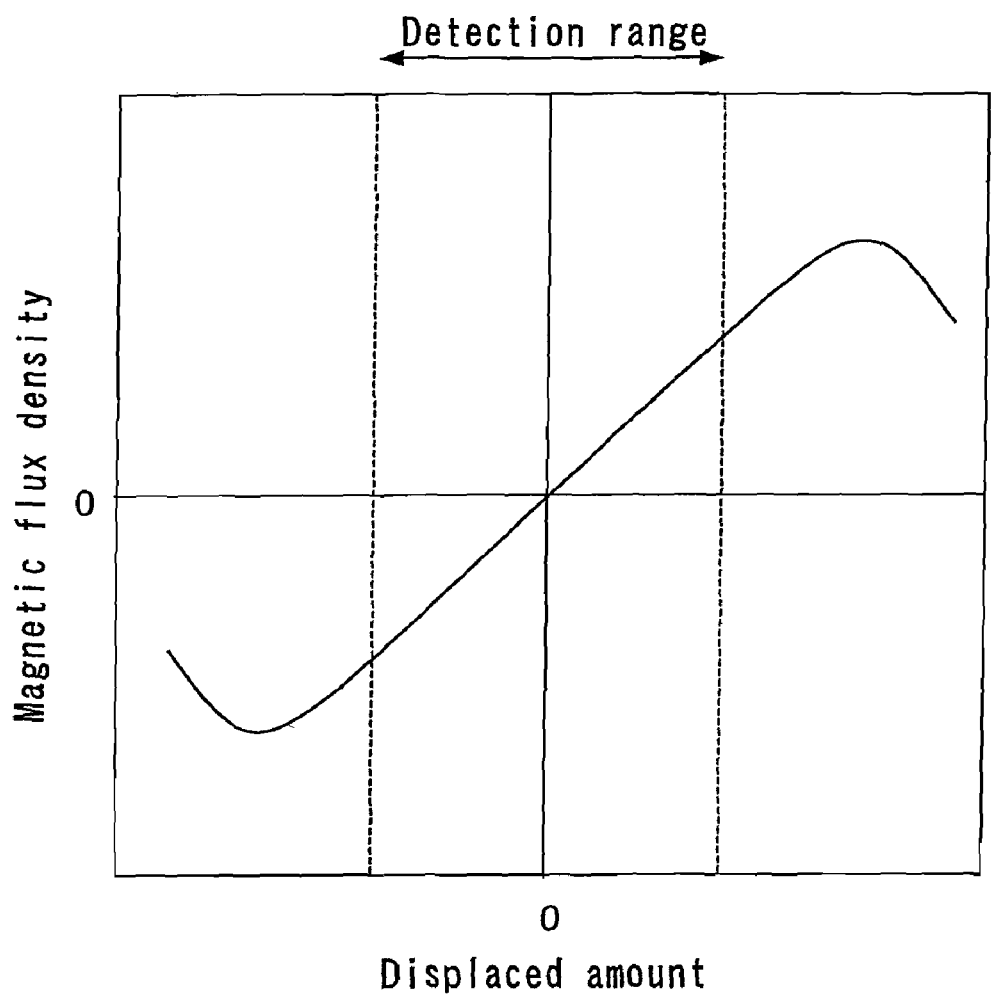
FIG. 9 shows the relationship between a displaced amount of a position detecting portion of the image blurring correcting device and a magnetic flux density in the collapsible lens barrel according to the first embodiment of the present invention.

The image blurring correcting device 31 for correcting an image blurring using the image blurring correcting lens group L3 will be described in detail, referring to FIG. 8.

The image blurring correcting lens group L3 for correcting an image blurring at the time of image capturing is fixed to a pitching moving frame 32 that is movable in the pitching direction, which is the first direction (the Y direction) and the yawing direction, which is the second direction (the X direction). This pitching moving frame 32 has a bearing 32*a* on a −X direction side and a rotation stopper 32*b* on a +X direction side. A pitching shaft 33*a* parallel with the Y-axis direction is inserted into this bearing 32*a* and a pitching shaft 33*b* parallel with the Y-axis direction, which will be described later, is allowed to mate with the rotation stopper 32*b*, so that the pitching moving frame 32 can slide in the first direction (Y direction).

A yawing moving frame 34 for moving the image blurring correcting lens group L3 in the second direction (X direction) is provided on the −Z direction side with respect to the pitching moving frame 32. The yawing moving frame 34 is provided with fixing portions 34*a* that fix both ends of the two pitching shafts 33*a* and 33*b* for sliding the above-described pitching moving frame 32 in the pitching direction (Y direction). Also, the yawing moving frame 34 has a bearing 34*b* on a +Y direction side and a yawing shaft 35*b* and a fixing portion 34*c* to which both ends of the yawing shaft 35*b* are press-fitted and fixed on a −Y direction side. A yawing shaft 35*a* parallel with the X direction is inserted into this bearing 34*b* and the yawing shaft 35*b* parallel with the X direction is allowed to mate with a rotation stopper portion 8*d* of the third group frame 8, so that the yawing moving frame 34 can slide in the second direction (X direction).

The third group frame 8 provided on the −Z direction side with respect to the yawing moving frame 34 is provided with a fixing portion 8*c* that fixes the both ends of the yawing shaft 35*a* for sliding the above-described yawing moving frame 34 in the yawing direction (X direction) and the rotation stopper portion 8*d* with which the yawing shaft 35*b* mates.

A substantially L-shaped electric substrate 36 is attached to a −Z direction side surface of the pitching moving frame 32. The electric substrate 36 is provided with a first coil 37*y* and a second coil 37*x* for driving the image blurring correcting lens group L3 in the pitching direction and the yawing direction, respectively, and Hall elements 38*y* and 38*x* for detecting the position of the image blurring correcting lens group L3 in the pitching direction and that in the yawing direction, respectively. These coils 37*y* and 37*x* are formed as layered coils in one piece with the electric substrate 36.

Magnets 39*y* and 39*x* are two-pole magnetized on one side. These magnets 39*y* and 39*x* respectively are fixed to yokes 40*y* and 40*x* having a substantially U-shaped cross-section. The yoke 40*y* is fixed to a fitting portion 8*y* of the third group frame 8 by press-fitting from the Y direction. Similarly, the yoke 40*x* is fixed to a fitting portion 8*x* of the third group frame 8 by press-fitting from the X direction.

The first electromagnetic actuator 41*y* includes the first coil 37*y*, the magnet 39*y* and the yoke 40*y*. Similarly, the second electromagnetic actuator 41*x* includes the second coil 37*x*, the magnet 39*x* and the yoke 40*x*. The first electromagnetic actuator 41*y* constitutes a first driving means for driving the pitching moving frame 32 in the pitching direction (Y direction), which is the first direction, and the second electromagnetic actuator 41*x* constitutes a second driving means for driving the pitching moving frame 32 in the yawing direction (X direction), which is the second configuration.

With the above-described configuration, when an electric current is passed through the first coil 37*y* of the electric substrate 36, the magnet 39*y* and the yoke 40*y* generate an electromagnetic force along the pitching direction (Y direction), which is the first direction. In a similar manner, when an electric current is passed through the second coil 37*x* of the electric substrate 36, the magnet 38*x* and the yoke 40*x* generate an electromagnetic force along the yawing direction (X direction), which is the second direction. In this way, the two electromagnetic actuators 41*y* and 41*x* drive the image blurring correcting lens group L3 in the two directions, i.e., the X direction and the Y direction that are substantially perpendicular to the optical axis Z.

The following is a description of position detecting portions 42*y* and 42*x* for detecting the position of the image blurring correcting lens group L3. The Hall elements 38*y* and 38*x* for converting a magnetic flux into an electrical signal are positioned and fixed to the electric substrate 36. The above-described magnets 39*y* and 39*x* of the electromagnetic actuators 41*y* and 41*x* also serve as detecting magnets. Accordingly, the Hall elements 38*y* and 38*x* and the magnets 39*y* and 39*x* constitute the position detecting portions 42*y* and 42*x*. Here, referring to FIG. 9, the state of the magnetic fluxes of the magnets 39*x* and 39*y* will be described. The horizontal axis of the figure indicates a position in the pitching direction (the Y direction) or the yawing direction (the X direction) with the optical axis being the center, while the vertical axis indicates a magnetic flux density. The center of the horizontal axis corresponds to a boundary in the two-pole magnetized magnet 39*x* or 39*y*, and the magnetic flux density is zero at this position. This position substantially coincides with the center of the optical axis of the image blurring correcting lens group L3. The Hall elements 38*y* and 38*x* move with respect to the magnets 39*y* and 39*x*, whereby the magnetic flux density varies substantially linearly with the change in a displaced amount within the range that centers on the zero position of the displaced amount and is indicated by broken lines. Thus, by detecting the electric signal outputted from the Hall elements 38*y* and 38*x*, it becomes possible to detect the position of the image blurring correcting lens group L3 in the pitching direction (the Y direction) and the yawing direction (the X direction).

A flexible print cable 43 transmits signals between a circuit of a camera main body, which is not shown in the figure, and the coils 37*x* and 37*y* and the Hall elements 38*x* and 38*y* that are mounted on the electric substrate 36.

The elements 32 to 43 described above constitute the image blurring correcting device 31.

Figure 10:
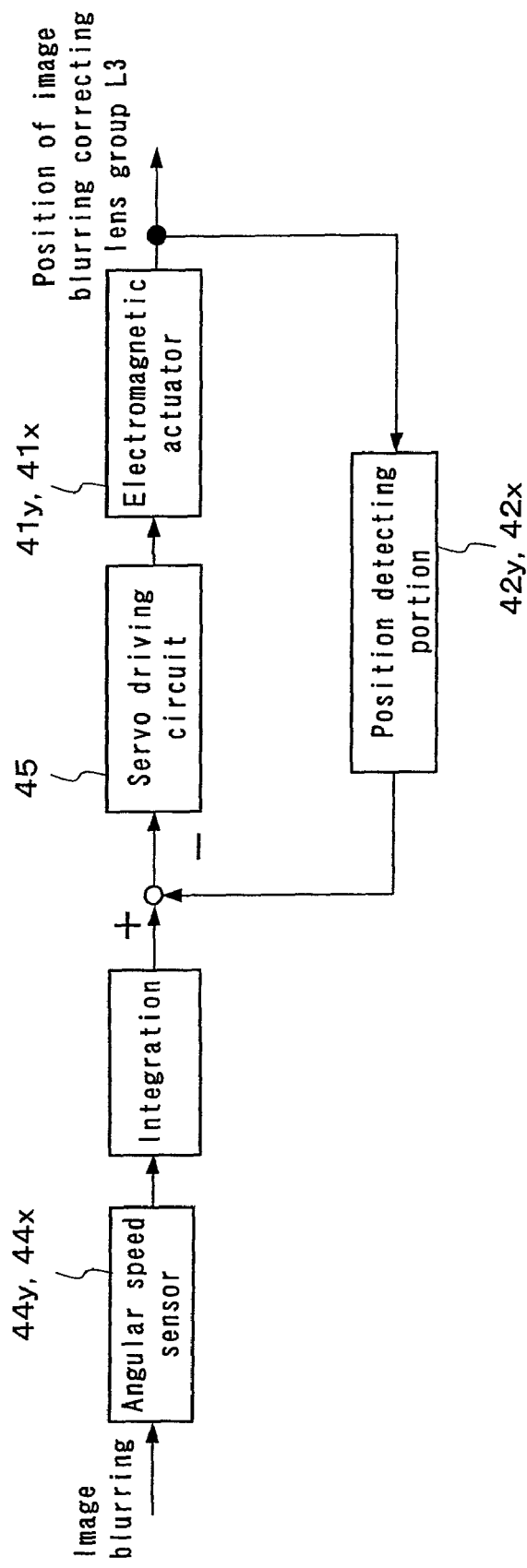
FIG. 10 is a block diagram for describing an operation of the image blurring correcting device in the collapsible lens barrel according to the first embodiment of the present invention.

Now, the following description is directed to an operation of the image blurring correcting device 31 with reference to FIG. 10.

Image blurring is caused by displacement and vibrations of a camera due to hand movement. A camera incorporating the image blurring correcting device 31 detects these displacement and vibrations with two angular speed sensors 44*y* and 44*x* that are disposed so as to have a detecting direction of substantially 90°. Outputs of the angular speed sensors 44*y* and 44*x* are time-integrated. Subsequently, they are converted into an angle at which the camera main body has moved and then converted into target position information of the image blurring correcting lens group L3. In order to move the image blurring correcting lens group L3 according to this target position information, a servo driving circuit 45 calculates a difference between the target position information and current positional information of the image blurring correcting lens group L3 detected by the position detecting portions 42y and 42x and transmits a signal to the electromagnetic actuators 41y and 41x. According to this signal, the electromagnetic actuators 41y and 41x drive the image blurring correcting lens group L3.

With respect to the driving in the pitching direction (Y direction), which is the first direction, the electromagnetic actuator 41y that has received an instruction from the servo driving circuit 45 passes an electric current through the first coil 37y via the flexible print cable 43 so as to generate a force in the pitching direction (Y direction), thereby driving the pitching moving frame 32 in the pitching direction (Y direction).

Also, with respect to the driving in the yawing direction (X direction), which is the second direction, the electromagnetic actuator 41x that has received an instruction from the servo driving circuit 45 passes an electric current through the second coil 37x via the flexible print cable 43 so as to generate a force in the yawing direction (X direction), thereby driving the yawing moving frame 34 and the pitching moving frame 32 mounted thereon in the yawing direction (X direction).

In this way, the image blurring correcting lens group L3 can be moved as desired within a two-dimensional plane perpendicular to the optical axis by the pitching moving frame 32 and the yawing moving frame 34, making it possible to correct the image blurring caused by camera shake.

Next, positions in the cam frame 17 to which the second group lens driving actuator 6, the home position detecting sensor 25 and the driving gear 19 are mounted will be described.

Figure 11:
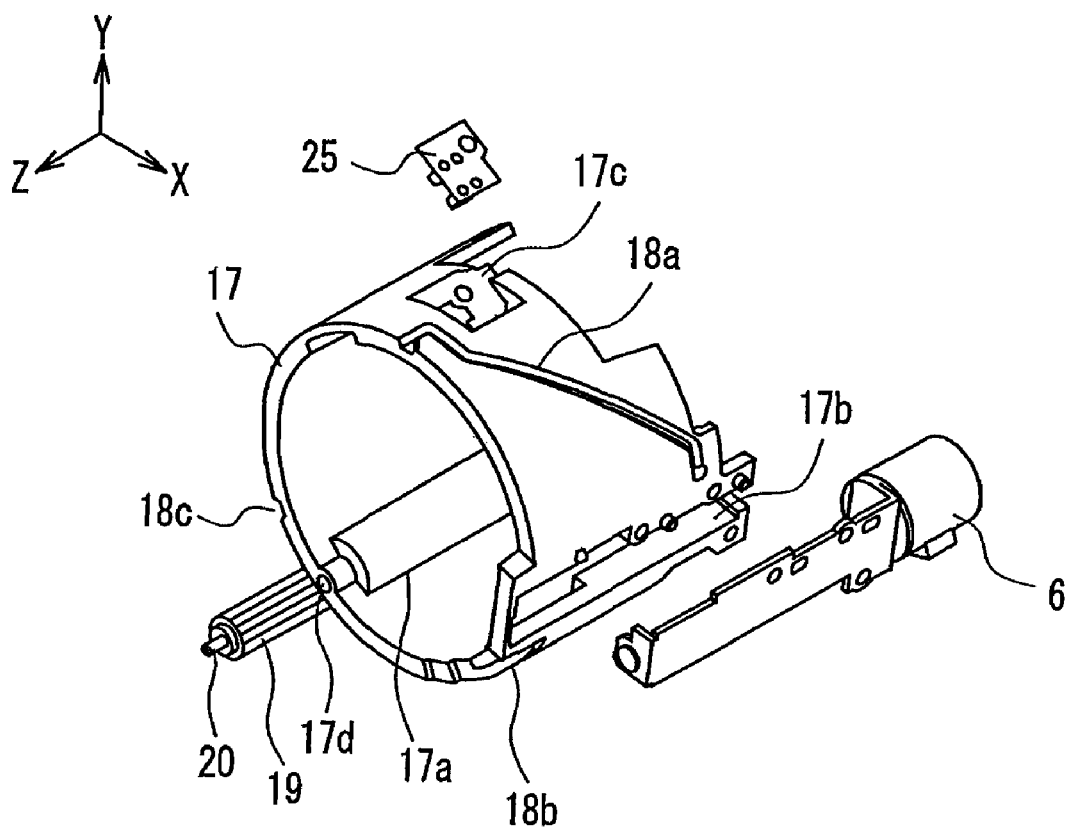
FIG. 11 is an exploded perspective view showing a cam frame in the collapsible lens barrel according to the first embodiment of the present invention.

As shown in FIG. 11, the second group lens driving actuator 6 is mounted to the mounting portion 17b of the cam frame 17. The home position detecting sensor 25 of the second group lens L2 is mounted onto the mounting portion 17c of the cam frame 17, and the blade 5c provided in the second group moving frame 5 passes in front of the home position detecting sensor 25 and blocks light, thereby allowing the home position to be detected. Further, as described earlier, the driving gear 19 is mounted to the bearing portion 17d and the driving gear mounting portion (recessed portion) 17a of the cam frame 17.

FIG. 5 shows the relationship of the three cam grooves 18a, 18b and 18c and the three mounting portions 17a, 17b and 17c when they are developed. In other words, the mounting portion 17a is provided between the cam grooves 18b and 18c, the mounting portion 17b is provided between the cam grooves 18a and 18b, and the mounting portion 17c is provided between the cam grooves 18c and 18a. By providing the mounting portions 17a, 17b and 17c between these cam grooves in this way, it becomes possible to mount the driving gear 19, the second group lens driving actuator 6 and the home position detecting sensor 25 to the cam frame 17 with the mounting portions 17a, 17b and 17c not interfering with the cam grooves 18a, 18b and 18c.

Figure 14:
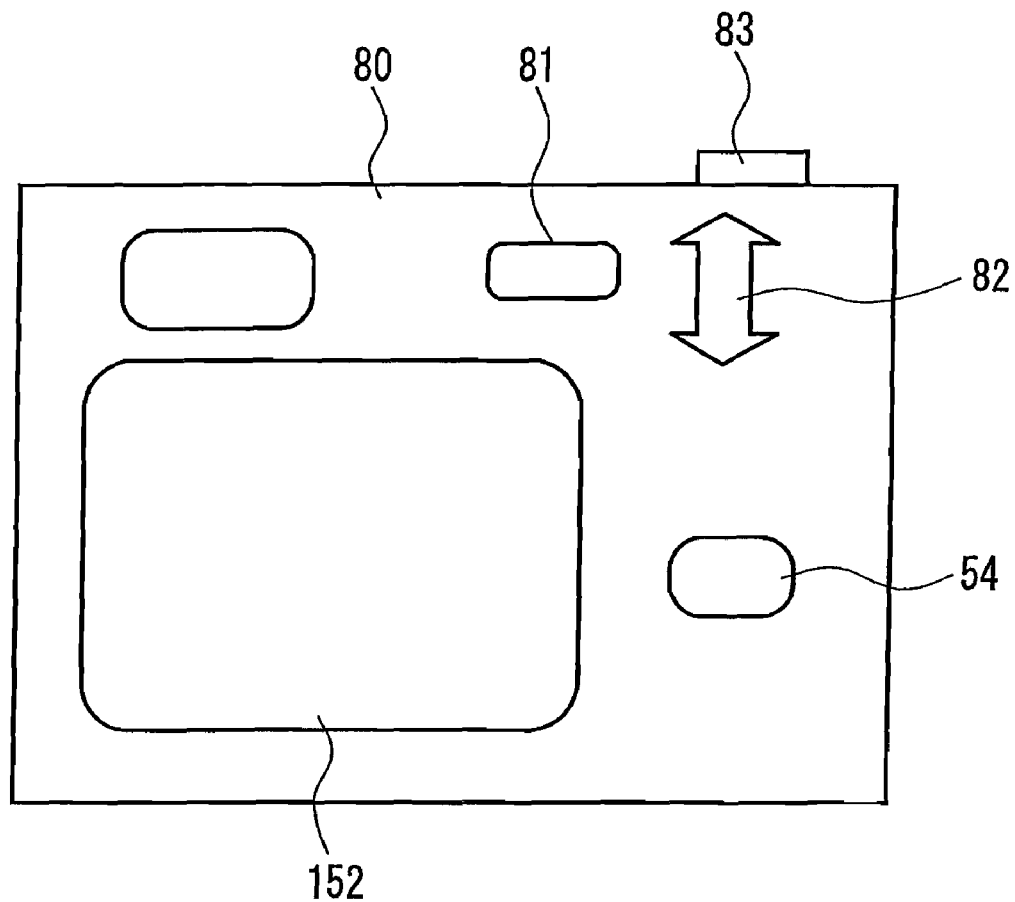
FIG. 14 is a schematic view showing an operating portion of the optical instrument according to the first embodiment of the present invention.

An actuator driving circuit in an optical instrument (in this case, a DSC 80) including the collapsible lens barrel according to the present embodiment will be described with reference to FIGS. 12 and 14.

The DSC 80 includes a microcomputer 50 for controlling the DSC 80. This microcomputer 50 drives and controls the first group lens driving actuator 22 via a driving control system 84 based on a signal from a power source button 81 provided in the DSC 80 and, after the home position detecting sensor 27 detects the home position of the first group lens L1, drives the first group lens L1 to a predetermined position. Also, the microcomputer 50 drives and controls the second group lens driving actuator 6 via a driving control system 85 based on a signal from a zooming lever 82 and, after the home position detecting sensor 25 detects the home position of the second group lens L2, drives the second group lens L2 to a predetermined zoom position. Furthermore, when a shutter button 83 is pressed down, the microcomputer 50 drives and controls the fourth group lens driving actuator 12 via a driving control system 86 and, after the home position detecting sensor 26 detects the home position of the fourth group lens L4, obtains focus.

Figure 13:
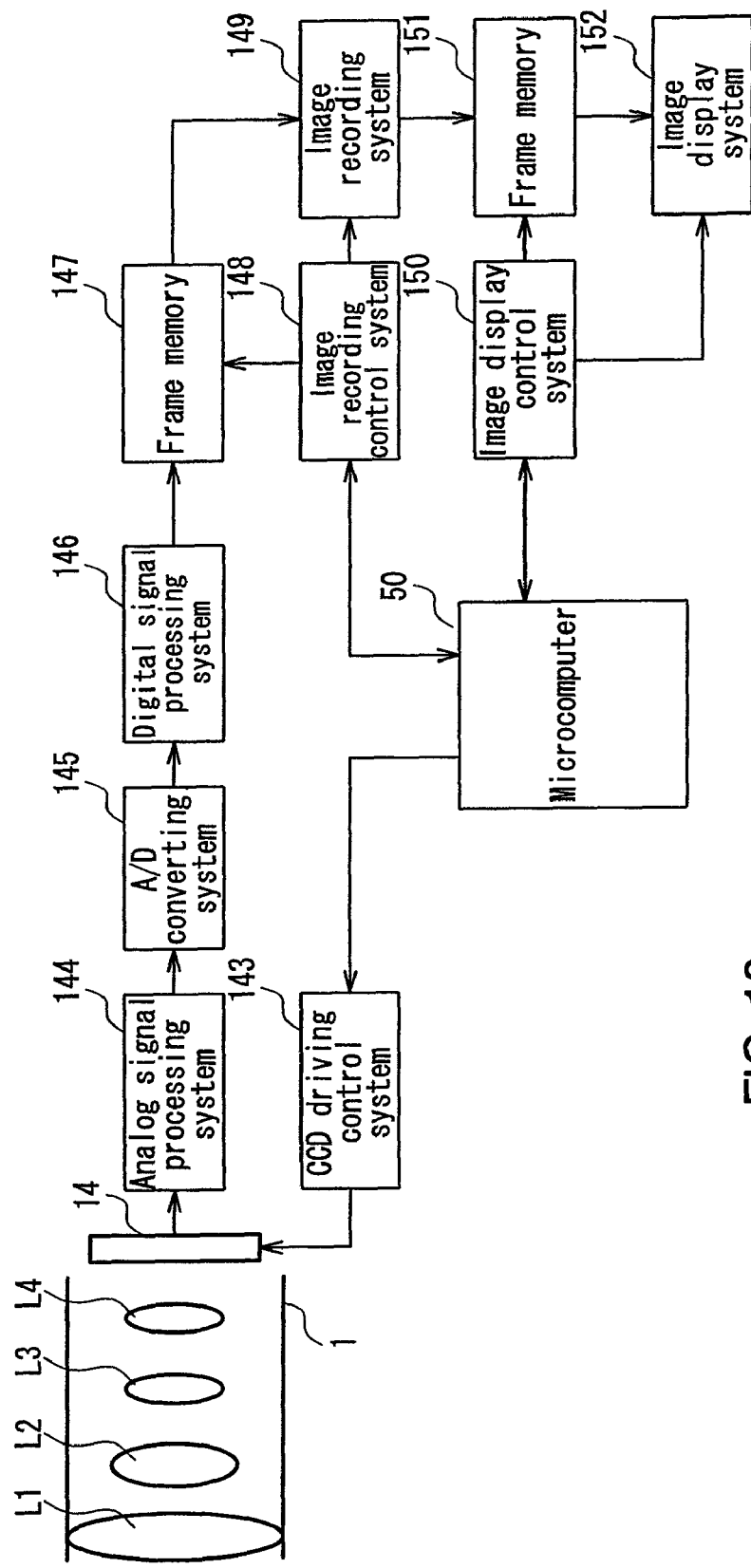
FIG. 13 a block diagram showing a hardware configuration of an image processing portion in the optical instrument according to the first embodiment of the present invention.

Next, an image processing of the DSC 80 will be described referring to FIGS. 13 and 14.

The imaging element (CCD) 14 converts an image entering via the collapsible lens barrel 1 into an electric signal. An imaging element driving control system 143 controls the operation of the imaging element 14. An analog signal processing system 144 performs an analog signal processing such as a gamma processing with respect to a video signal obtained by the imaging element 14. An A/D converting system 145 converts the analog video signal outputted from the analog signal processing system 144 into a digital signal. A digital signal processing system 146 performs a digital signal processing such as a noise removal and an edge enhancement with respect to the video signal that has been converted into the digital signal by the A/D converting system 145. A frame memory 147 temporarily stores an image signal that has been processed by the digital signal processing system 146. An image recording control system 148 controls writing of the image stored temporarily in the frame memory 147 into an image recording system 149 such as an internal memory or a recording medium. According to: a signal from an image display control system 150, the captured image recorded in the image recording system 149 is displayed via a frame memory 151 on an image display system 152 such as a liquid crystal monitor mounted on the DSC 80.

Figure 15:
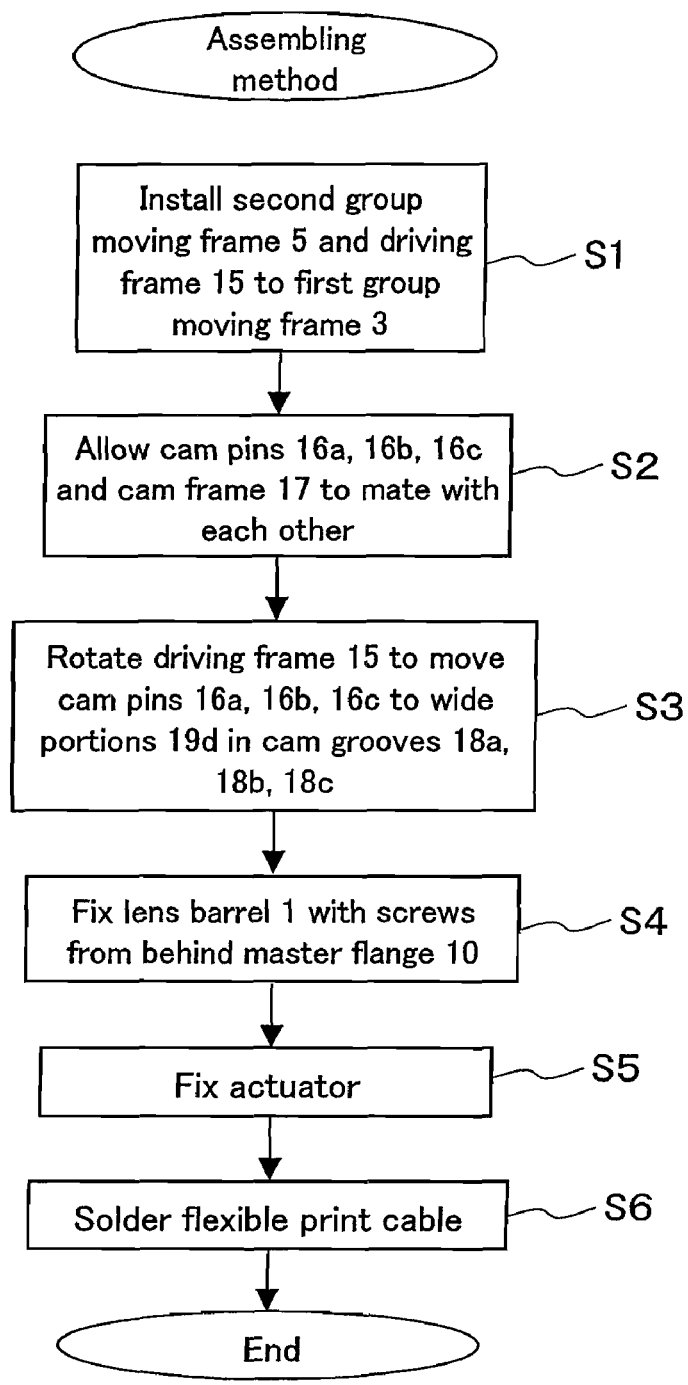
FIG. 15 is a flowchart showing a method for assembling the collapsible lens barrel according to the first embodiment of the present invention.

The collapsible lens barrel 1 constituted as above can be assembled by following steps S1 to S6 shown in FIG. 15. In the following, each of these steps will be described sequentially.

(First Assembling Step S1)

Figure 16:
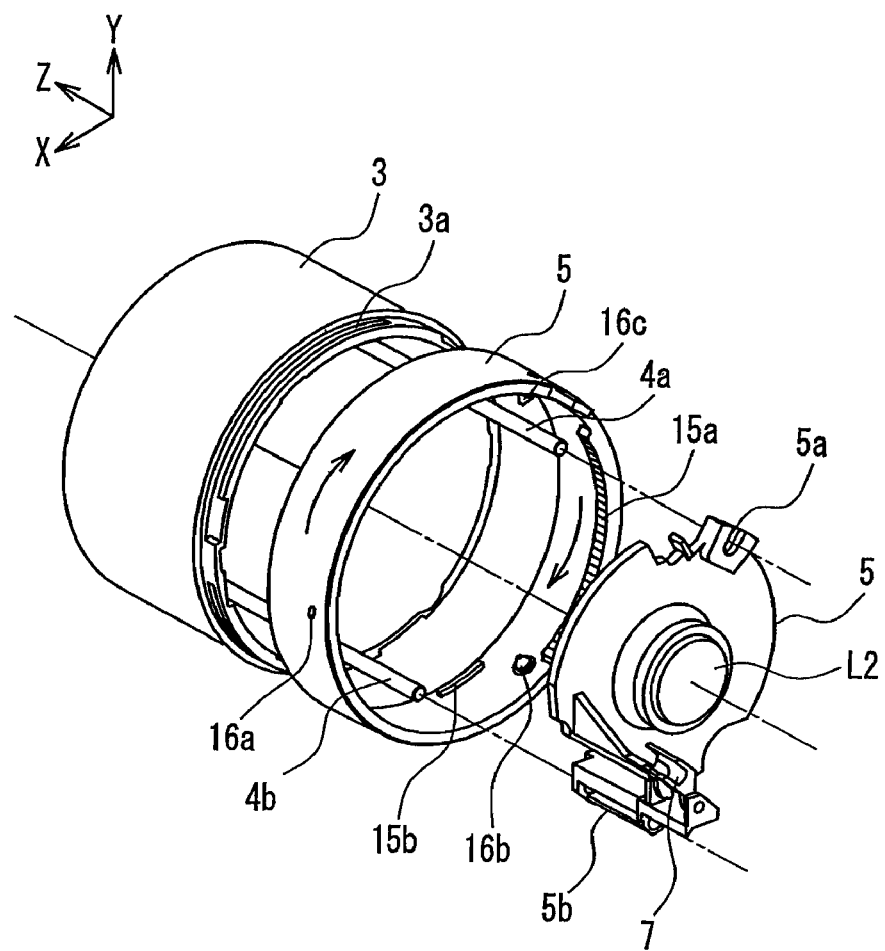
FIG. 16 is a perspective view for describing a first assembling step in the method for assembling the collapsible lens barrel according to the first embodiment of the present invention.

As shown in FIG. 16, the guide poles 4a and 4b fixed to the first group moving frame 3 respectively are inserted into the supporting portions 5a and 5b of the second group moving frame 5. Further, the protruding portions 15b provided in the driving frame 15 are allowed to mate with a groove portion 3a provided in the first group moving frame 3, and then the driving frame 15 is rotated in a direction indicated by an arrow.

(Second Assembling Step S2)

Figure 17:
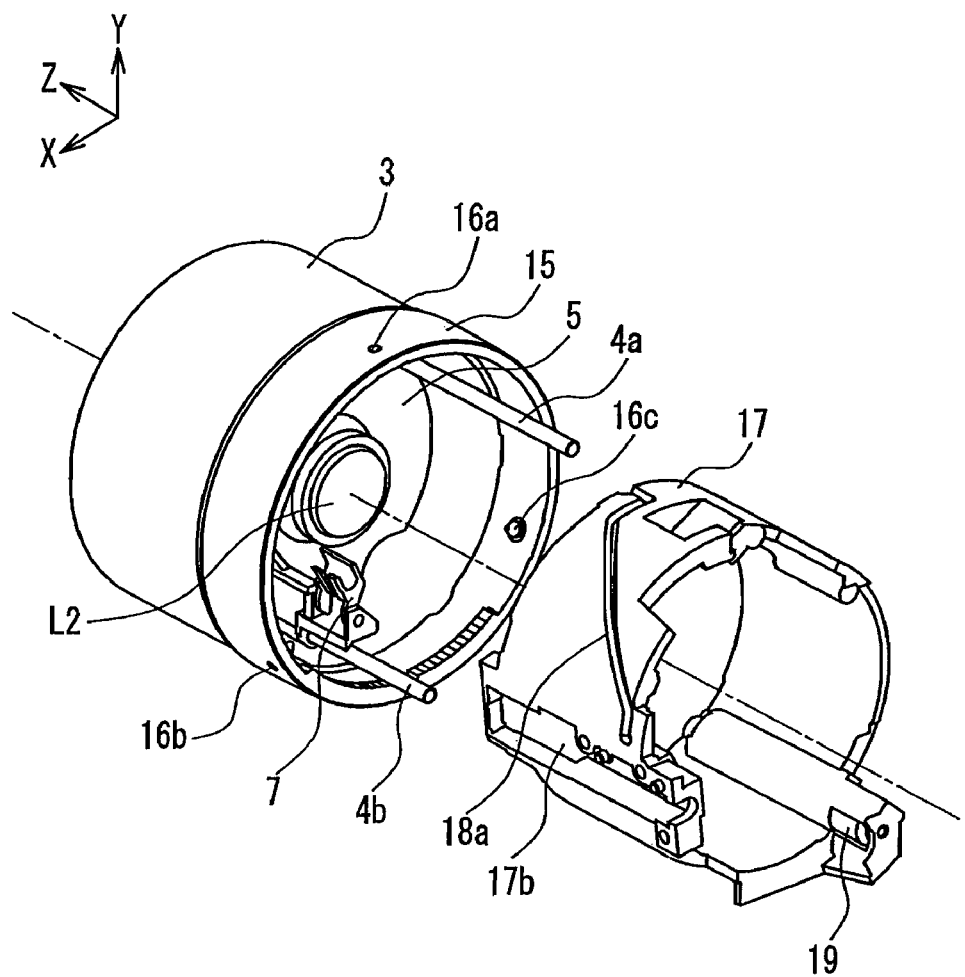
FIG. 17 is a perspective view for describing a second assembling step in the method for assembling the collapsible lens barrel according to the first embodiment of the present invention.

As shown in FIG. 17, the cam pins 16a, 16b and 16c protruding from an inner wall surface of the driving frame 15 are allowed to mate with the cam grooves 18a, 18b and 18c provided on the outer peripheral surface of the cam frame 17.

(Third Assembling Step S3)

Figure 18:
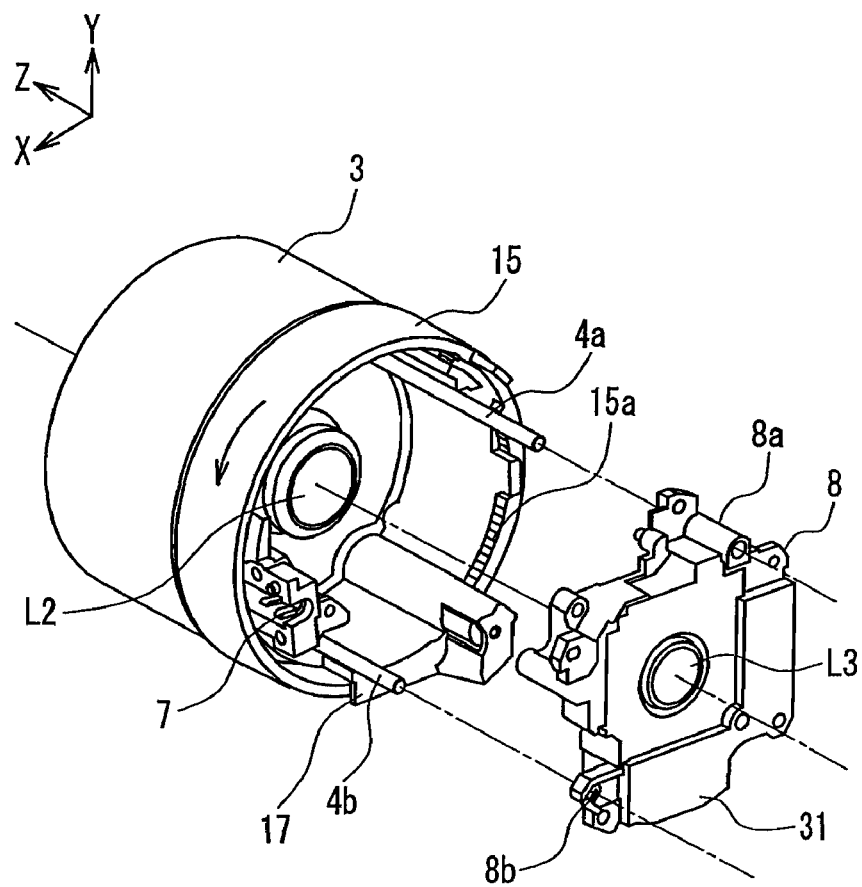
FIG. 18 is a perspective view for describing a third assembling step in the method for assembling the collapsible lens barrel according to the first embodiment of the present invention.

As shown in FIG. 18, the driving frame 15 is rotated in a direction indicated by an arrow. Since the cam pins 16a, 16b and 16c and the cam grooves 18a, 18b and 18c mate with each other, the rotation of the driving frame 15 causes the cam frame 17 to move in the Z-axis direction and be received in the driving frame 15. The rotation of the driving frame 15 moves the cam pins 16a, 16b and 16c to the positions of the wide portions 19d at terminal ends of the cam grooves 18a, 18b and 18c. Next, the guide poles 4a and 4b are inserted into the supporting portions 8a and 8b of the third group frame 8 on which the image blurring correcting device 31 is mounted.

(Fourth Assembling Step S4)

Figure 19:
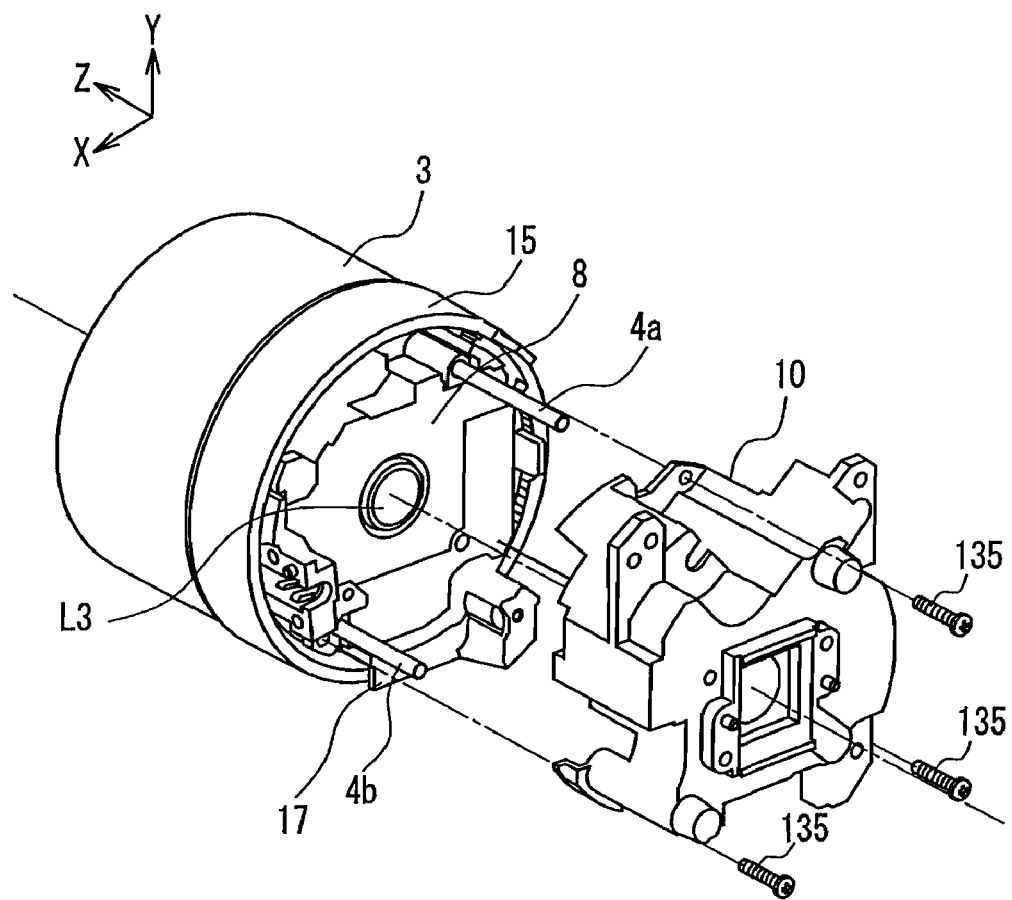
FIG. 19 is a perspective view for describing a fourth assembling step in the method for assembling the collapsible lens barrel according to the first embodiment of the present invention.

As shown in FIG. 19, after guide poles 11a and 11b and the fourth group moving frame 9, which are not shown in the figure, are inserted behind the third group frame 8, the master flange 10 is incorporated. Then, from behind the master flange 10, the cam frame 17, the third group frame 8 and the master flange 10 are fixed with three screws 135.

Figure 20:
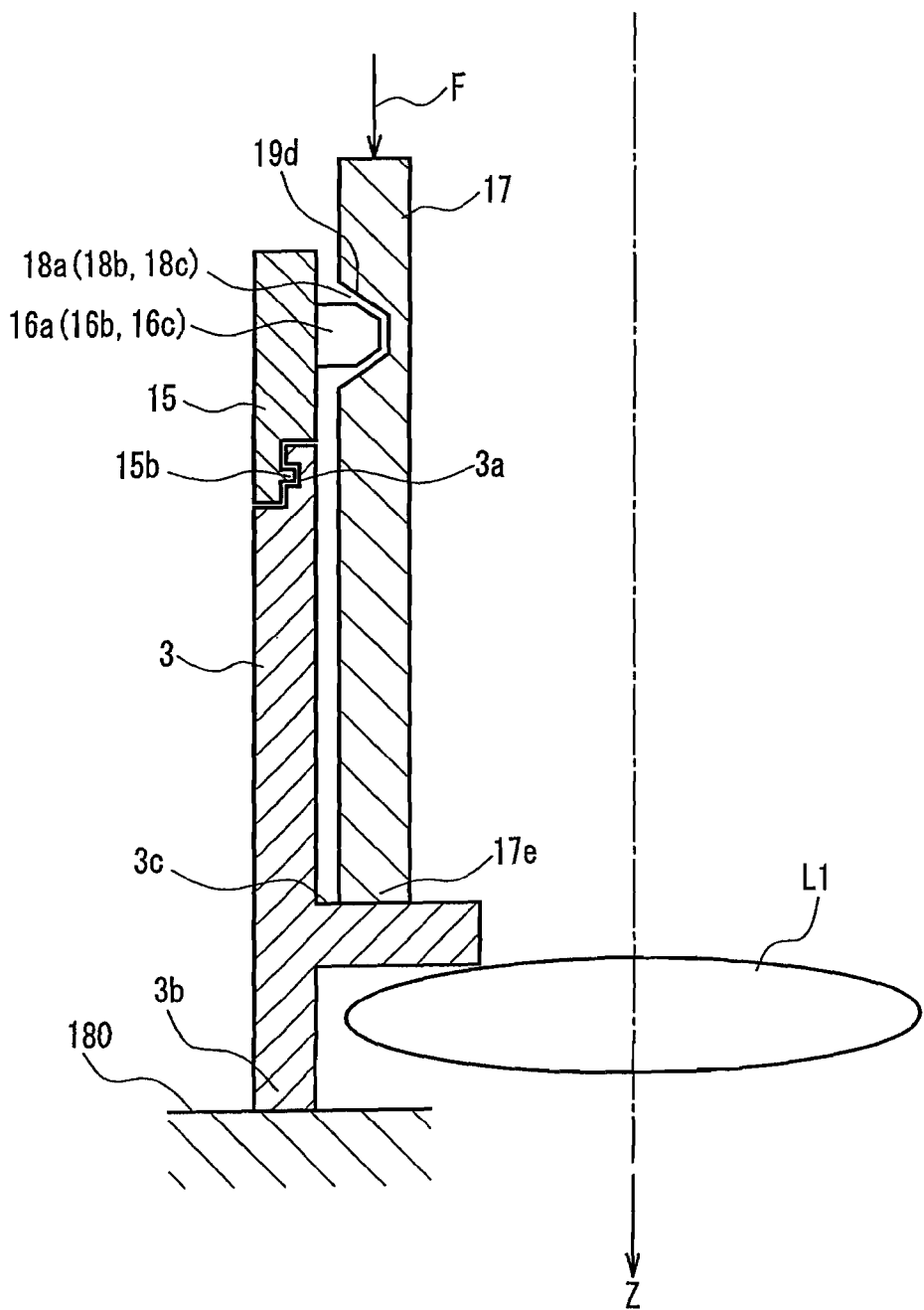
FIG. 20 is a sectional view for describing how the cam pin and the cam groove mate with each other in the fourth assembling step in the collapsible lens barrel according to the first embodiment of the present invention.

Referring to FIG. 20, how the cam pins 16a, 16b and 16c mate with the cam grooves 18a, 18b and 18c in the fourth assembling step will be described. The lens barrel 1 is fastened with screws while keeping an end surface 3b. on the object side of the first group moving frame 3 in contact with a placement surface 180 such that the first group lens L1 faces downward. When fastening with screws, a downward load F acts on the cam frame 17. At this time, the cam pins 16a, 16b and 16c are located in the wide portions 19d at terminal ends of the cam grooves 18a, 18b and 18c. Therefore, even under the load F, the cam pins 16a, 16b and 16c do not contact the cam grooves 18a, 18b and 18c. The load F is supported by the contact between an image-plane-side end surface 3c of a ring-shaped portion formed so as to protrude from the inner surface of the first group moving frame 3 and an object-side end surface 17e of the cam frame 17. Consequently, the load F does not act on the cam pins 16a, 16b and 16c or the cam grooves 18a, 18b and 18c at the time of fastening with screws so as to cause problems such as deformation of the cam pins 16a, 16b and 16c or damage to the cam grooves 18a, 18b and 18c.

(Fifth Assembling Step S5)

The second group lens driving actuator 6 is fixed to the cam frame 17, and the first group lens driving actuator 22 and the fourth group lens driving actuator 12 are fixed to the master flange 10.

(Sixth Assembling Step S6)

Figure 21:
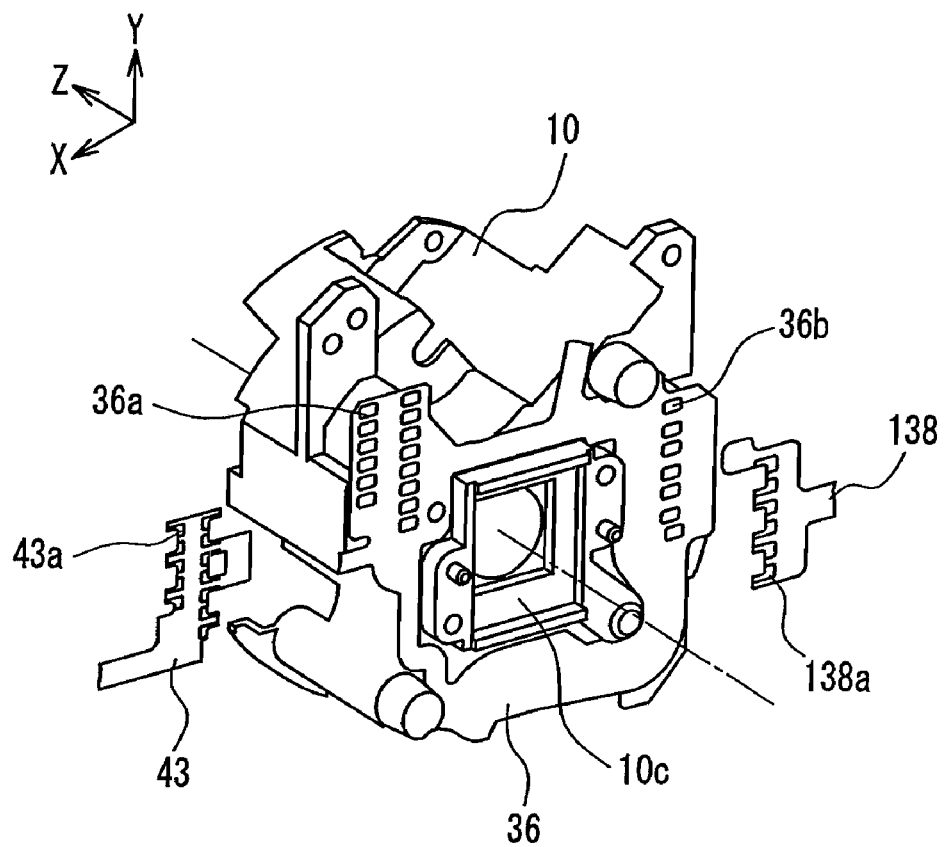
FIG. 21 is a perspective view for describing how to fix a flexible print cable in the method for assembling the collapsible lens barrel according to the first embodiment of the present invention.

As shown in FIG. 21, the flexible print cable 43 for the image blurring correcting device 31 and a flexible print cable 138 for the shutter unit 24 are soldered to the electric substrate (a flexible printed circuit board) 36 attached to the master flange 10 so that soldering portions 36a and 43a are fixed to each other and soldering portions 36b and 138a are fixed to each other. Then, the imaging element 14 is fixed to a fixing portion 10c of the master flange 10.

In the above manner, the assembly of the collapsible lens barrel 1 is completed.

In the following, the operation of the collapsible lens barrel 1 constituted as above will be explained.

First, in the operation of the collapsible lens barrel 1, an operation of shifting from a non-capturing (non-use) state shown in FIG. 22 via a state shown in FIG. 23 to a capturing (wide angle end) state shown in FIG. 24 will be described.

Figure 22:
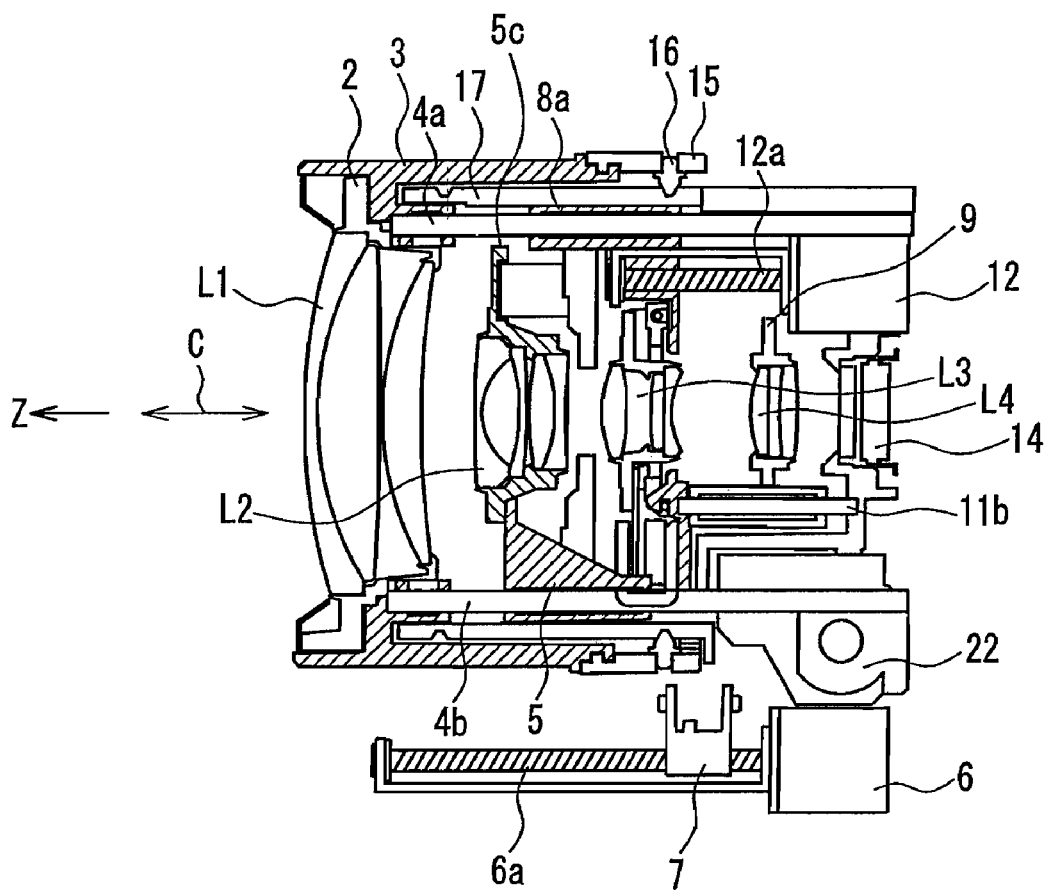
FIG. 22 is a sectional view showing the collapsible lens barrel when it is collapsed according to the first embodiment of the present invention.

In the non-capturing state shown in FIG. 22, turning on a power source switch or the like of the DSC 80 starts a state ready for image capturing. First, the first group lens driving actuator 22 for driving the first group lens L1 rotates, so that the driving gear 19 is rotated via the reduction gear unit 23. The rotation of the driving gear 19 causes the driving frame 15, which engages with the driving gear 19, both to rotate around the optical axis and to move in the cam grooves 18a, 18b and 18c along the optical axis. After the home position detecting sensor 27 is initialized, the driving frame 15 moves in an object direction (the Z-axis direction), whereby the first group moving frame 3 also moves in the object direction. Then, when a rotation amount detecting sensor, which is not shown in the figure, detects that the first group lens driving actuator 22 has moved by a predetermined rotation amount, the first group moving frame 3 moves to a predetermined position, and then the rotation of the first group lens driving actuator 22 stops. At this stop position, the cam pins 16a, 16b and 16c already have reached the portion 19c that is substantially parallel with the circumferential direction of the cam frame 17 in the development of the cam grooves in FIG. 5. FIG. 23 shows this state.

Next, in order to move the second group lens L2 serving as a zooming lens to a predetermined position, the second group lens driving actuator 6 rotates and drives the rack 7 via the feed screw 6a, so that the second group moving frame 5 starts moving along the Z axis.

First, the description is directed to the case where no initial position of a zooming factor after turning on the power source is set in the microcomputer 50 in the DSC 80.

Figure 24:
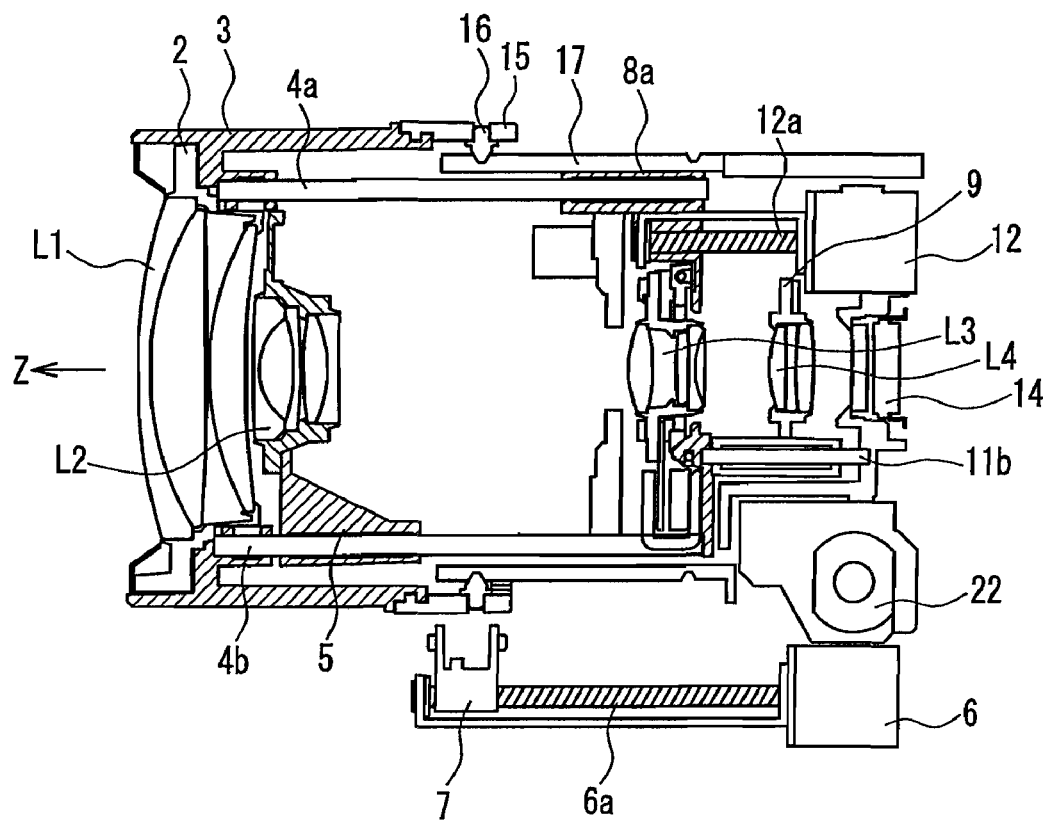
FIG. 24 is a sectional view showing the collapsible lens barrel when it is used at a wide angle end according to the first embodiment of the present invention.

After initializing the home position detecting sensor 25, the second group moving frame 5 moves in the object direction and stops at the wide angle end shown in FIG. 24, so that the camera main body is now able to capture an image.

Figure 23:
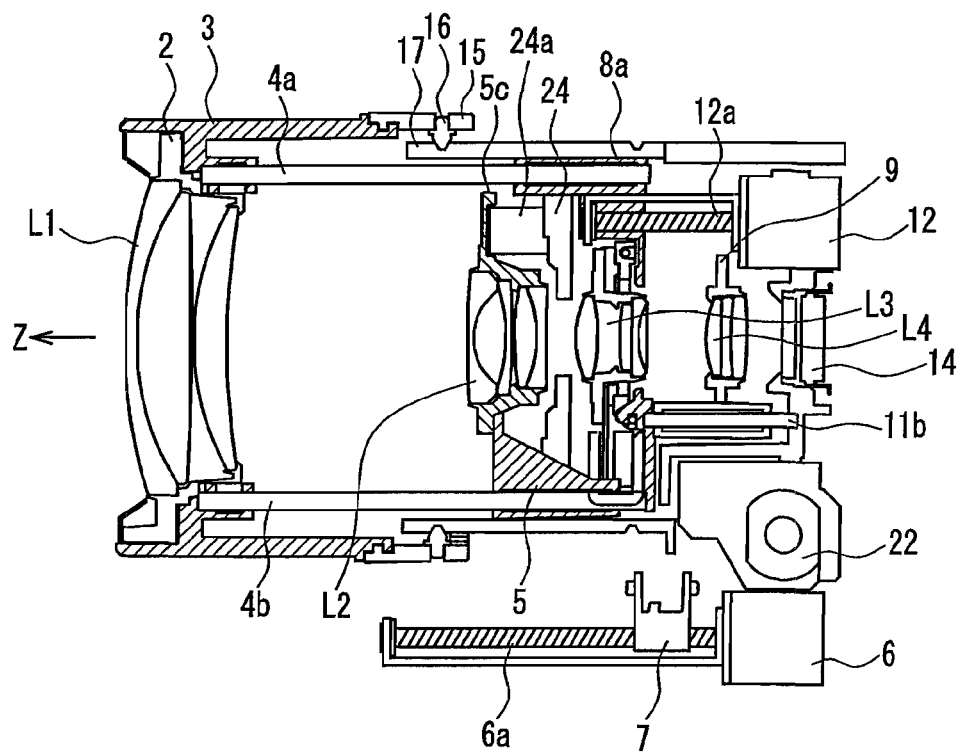
FIG. 23 is a sectional view showing the collapsible lens barrel when it is used at a telephoto end according to the first embodiment of the present invention.
Figure 26A:
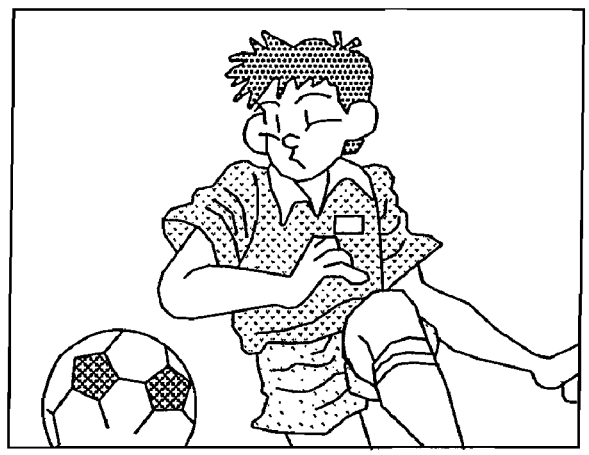
FIGS. 26A to 26C are drawings for describing images captured at predetermined zooming factors using the optical instrument according to the first embodiment of the present invention.

On the other hand, in the case where the initial position of the zooming factor after turning on the power source is set to the vicinity of a telephoto end in the microcomputer 50 in the DSC 80, after initializing the home position detecting sensor 25, the second group moving frame 5 stops in the vicinity of the telephoto end shown in FIG. 23, so that the DSC 80 becomes ready for image capturing. If the shutter button 83 is pressed down in this state, the image to be captured shows a scaled-up subject as shown in FIG. 26A.

Figure 25:
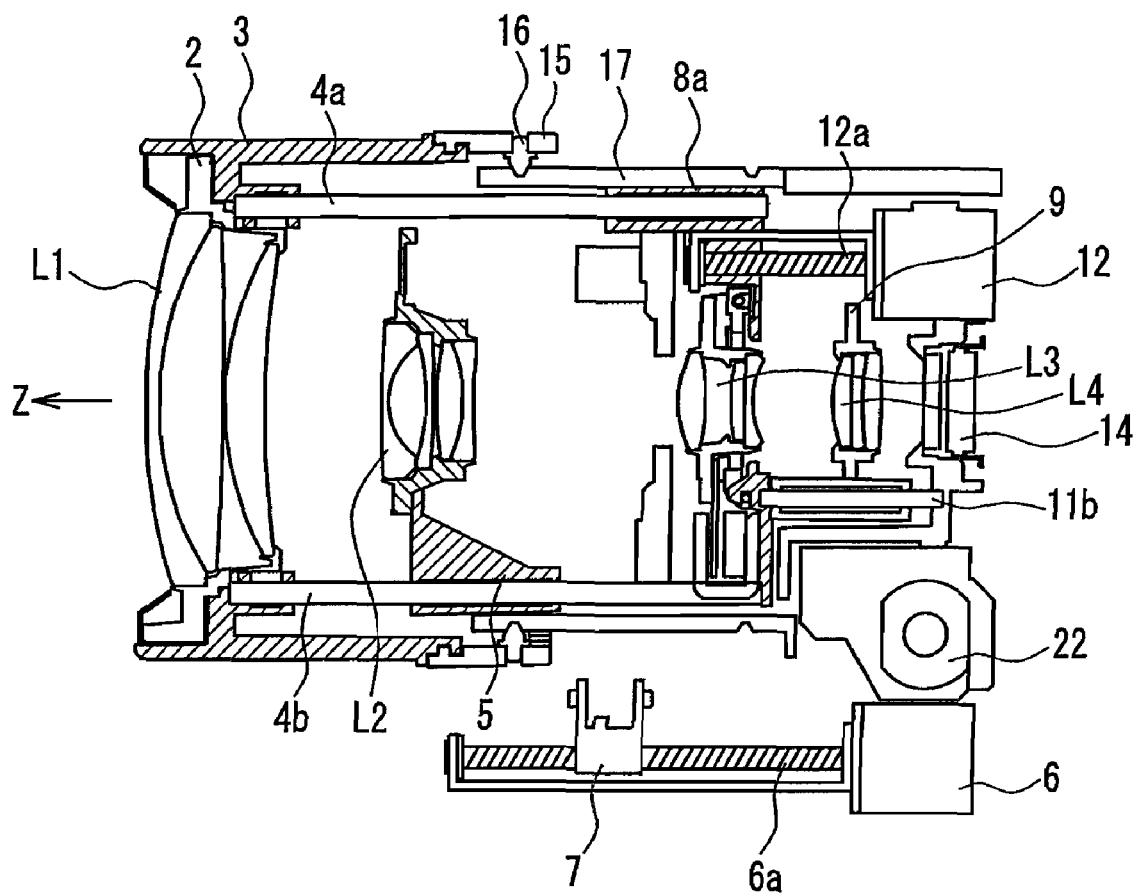
FIG. 25 is a sectional view showing the collapsible lens barrel when it is used at an intermediate position between the wide angle end and the telephoto end according to the first embodiment of the present invention.
Figure 26B:

Further, in the case where the initial position of the zooming factor after turning on the power source is set to substantially at the mid point between the telephoto end and the wide angle end in the microcomputer 50 in the DSC 80, after initializing the home position detecting sensor 25, tile second group moving frame 5 stops in the vicinity of the mid point shown in FIG. 25, so that the DSC 80 becomes ready for image capturing. If the shutter button 83 is pressed down in this state, the image to be captured is as shown in FIG. 26B.

Figure 26C:

In the case where the initial position of the zooming factor after turning on the power source is set to the vicinity of the wide angle end in the microcomputer 50 in the DSC 80, after initializing the home position detecting sensor 25, the second group moving frame 5 stops in the vicinity of the wide angle end shown in FIG. 24, so that the DSC 80 becomes ready for image capturing. If the shutter button 83 is pressed down in this state, the image to be captured is as shown in FIG. 26C.

In any of the above cases, the first group moving frame 3 and the second group moving frame 5 move to a predetermined position while being supported by the same guide poles 4a and 4b held by the supporting portions 8a and 8b in the third group frame 8. Accordingly, even when the first group lens L1 and the second group lens L2 tilt with respect to the optical axis, a certain optical performance can be secured because the directions of the tilt are the same with respect to the image blurring correcting lens group L3.

At the time of actual image capturing, the second group lens driving actuator 6 and the fourth group lens driving actuator 12 respectively perform a zooming operation and an operation of correcting an image plane fluctuation due to zooming and achieving focus. When zooming, an image is captured at the wide angle end in the state shown in FIG. 24 and at the telephoto end in the state shown in FIG. 23 in which the second group lens L2 is moved in a −Z direction (at the end on the imaging element 14 side). Thus, it is possible to capture an image at an arbitrary position from the wide angle end to the telephoto end.

Next, an operation of shifting from each of the capturing states shown in FIGS. 23, 24 and 25 to the non-capturing state shown in FIG. 22 will be described.

In each of the capturing states, when the power source button 81 in the DSC 80 is switched off, the image capturing ends. The second group moving frame 5 first is moved to the side of the imaging element 14 by the second group lens driving actuator 6, thus creating the state shown in FIG. 23. Subsequently, the first group lens driving actuator 22 rotates, thereby rotating the driving gear 19 in a direction opposite to the above via the reduction gear unit 23. The rotation of the driving gear 19 causes the driving frame 15, which is in engagement with the driving gear 19, to rotate around the optical axis, and at the same time, the cam grooves 18a, 18b and 18c allow the driving frame 15 to move in the direction of the imaging element 14, so that the first group moving frame 3 also moves. Thereafter, when the home position detecting sensor 27 detects the rotation of the driving frame 15, the first group moving frame 3 moves to a predetermined position, and then the rotation of the first group lens driving actuator 22 stops. At this stop position, the cam pins 16a, 16b and 16c already have reached the portion 19c that is substantially parallel with the circumferential direction of the cam frame 17 in the development of the cam grooves in FIG. 5. In this way, a collapsed state shown in FIG. 22 is achieved in which the length is reduced by a length C compared with the capturing state.

Here, in a collapsing operation of changing the length of the collapsible lens barrel 1 along the optical axis direction, the first group lens driving actuator 22 for driving the first group lens L1 is used. In a zooming operation, the second group lens driving actuator 6 is used alone. Thus, since the zooming operation in an actual image capturing is carried out with the first group lens L1 being advanced, there is no need to operate the first group lens driving actuator 22, and the second group lens driving actuator 6 alone is driven to move the second group lens L2 to a predetermined position between FIG. 23 and FIG. 24 for zooming. Accordingly, when conducting image capturing such as a zooming operation, it is not necessary to expand and retract a barrel according to a zooming factor unlike the conventional collapsible lens barrel shown in FIG. 35. In the conventional collapsible lens barrel shown in FIG. 35, in the zooming operation, one driving actuator 69 was rotated, and the cam barrel 61 was rotated via the reduction gear train 68, thereby driving the moving lens frames 62 and 63 at the same time, leading to a low zooming speed and a large driving noise. On the other hand, in the collapsible lens barrel 1 according to the present invention, a stepping motor is used as the second group lens driving actuator 6, and the second group moving frame 5 directly is driven via the feed screw 6a attached to this stepping motor, achieving a fast feed speed and a small operation noise. In this manner, even a collapsible lens barrel can achieve a faster zooming speed and a lower zooming noise. Thus, a user can change the angle of view instantly, making it possible to chase a subject, capture a moving image, etc., which have been difficult in conventional DSCs.

In the present embodiment, in order to move the second group lens L2 for zooming to a position of a predetermined zooming factor after turning on the power, the first group lens L1 has to be moved in advance from a position in the collapsed state to a predetermined position, and a certain time period is required therefore. However, instead of driving a plurality of the moving lens frames 62 and 63 by a single driving actuator 6 as in the conventional collapsible lens barrel shown in FIG. 35, the first group lens L1 and the second group lens L2 are driven by individual actuators. Thus, one actuator needs only a small driving force, and a driving speed (the number of revolutions of the actuator) can be increased, thus making it possible to shorten an entire time period.

As described above, according to the first embodiment, since the actuator 6 specifically for zooming can be attached without interfering with the cam grooves 18a, 18b and 18c of the cam frame 17, even a collapsible lens barrel can achieve a faster zooming speed and a lower zooming noise. Thus, a user can change the angle of view instantly, making it possible to chase a subject, capture a moving image, etc., which have been difficult with conventional DSCs.

According to the present embodiment, the first group lens L1 and the second group lens L2 are driven individually. In other words, only the second group lens L2 can be driven for zooming. Thus, it is possible to achieve a faster zooming speed and a lower zooming noise. Therefore, in a DSC in which sound is recorded using a microphone while capturing a moving image, for example, a level of recording a zooming noise, which is not preferable in itself, is lowered, thus improving a commercial value considerably.

Further, by disposing not only the actuator 6 for zooming but also the home position detecting sensor 25 and the driving gear 19 in a portion in the cam frame 17 where the cam grooves 18a, 18b and 18c are not formed, it becomes possible to achieve a high-density mounting that disposes all the components in the single cam frame 17, thus miniaturizing the lens barrel, reducing the number of components thanks to a simplified configuration and lowering costs.

Also, in the DSC incorporating a lens ready for a high zooming factor, the home position detecting sensor 25 is disposed so that an absolute position of the lens group L2 for zooming can be detected when this lens is at a collapsed position, in particular, a telephoto end position or in the vicinity thereof, thus making it possible to move the lens group L2 after turning on the power instantly to the vicinity of the telephoto end position not through the wide angle end. This produces a notable effect of preventing a user from missing an important shutter chance for scaled-up images.

Further, the structure in which the first group lens L1 and the second group lens L2 tilt at least the same direction with respect to the image blurring correcting lens L3 allows the entire length in non use to be reduced while minimizing the reduction of optical performance.

Furthermore, the guide poles 4a and 4b are fixed by being press-fitted into two through holes penetrating in the optical axis direction that are spaced from each other, whereby the number of assembling steps can be reduced compared with the conventional system of pre-fixing the guide pole with a jig intended for this purpose and adhering it. Also, the relative positions of the molding dies 29a and 29b forming the through holes within the plane perpendicular to the Z axis are adjusted, so that the orientations of the guide poles 4a and 4b can be adjusted easily, making it possible to fix the guide poles 4a and 4b in parallel with the optical axis.

Moreover, in the collapsible lens barrel including the tubular cam frame 17 and the substantially hollow cylindrical driving frame 15 provided with the cam pins 16a, 16b and 16c, the wide portions 19d are formed in the cam grooves so that the cam pins 16a, 16b and 16c do not contact the cam grooves 18a, 18b and 18c in the collapsed state. Consequently, even when a compression load in the optical axis direction is applied at the time of the assembly in the collapsed state, problems such as deformation of the cam pins 16a, 16b and 16c or damages to the cam grooves 18a, 18b and 18c are not caused.

Further, even in the collapsible lens barrel using the cam frame 17 whose assembly is complicated, by enabling the components to be installed and fastened with screws from one direction, it is possible to reduce the number of assembling steps and simplify the assembling work compared with a conventional method of assembling from both sides.

Although the first group frame 2 provided with the first group lens L1 and the first group moving frame 3 are different members in the present embodiment, they also may be formed as one piece to which the guide poles may be fixed.

Additionally, in the image blurring correcting device 31 described in the present embodiment, the position detecting means using the Hall elements also may be provided in other places. Alternatively, a magnetic position detecting means may be replaced by an optical position detecting means including a light-emitting element and a light-receiving element, for example.

Although the third group lens L3 can be moved in a direction perpendicular to the optical axis direction using the image blurring correcting device 31, it is needless to say that even a general lens barrel in which the third group lens L3 is fixed to the third group frame 8 and no image blurring correcting device is mounted can achieve a similar effect.

Although the first group moving frame 3 and the second group moving frame 5 are moved sequentially in the present embodiment, they also may be moved at the same time for shortening the time for expanding or collapsing. For example, when expanding the barrel, after the first group moving frame 3 starts moving and before it stops at a predetermined position, it may be possible to start moving the second group moving frame 5 from the collapsed position and stop it at the wide angle end position (or a desired zooming position). Also, when collapsing the barrel, after the second group moving frame 5 starts moving and before it stops at a predetermined position, it may be possible to start moving the first group moving frame 3 and stop it at the collapsed position.

Moreover, although the present embodiment has illustrated an example in which the actuator 6 for driving the second group lens L2, the position detecting sensor 25 of the second group lens L2 and the driving gear 19 for rotating the driving frame 15 are attached to the cam frame 17, the present invention is not limited to this configuration. Only the actuator 6 and the detecting sensor 25 or only the actuator 6 and the driving gear 19 may be attached to the cam frame 17.

Second Embodiment

Figure 27:
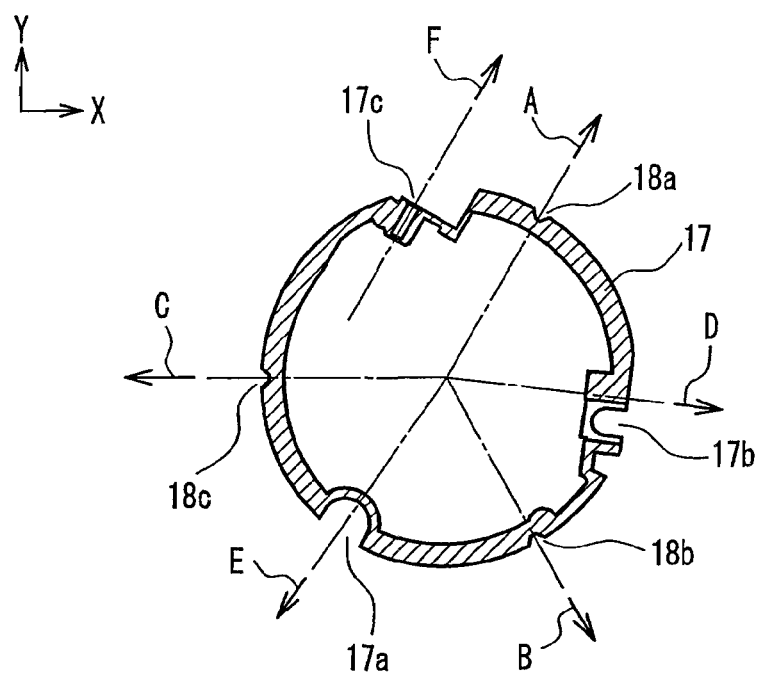
FIG. 27 is a sectional view showing a cam frame in a collapsible lens barrel according to a second embodiment of the present invention.

Hereinafter, a collapsible lens barrel in the second embodiment of the present invention will be described referring to FIG. 27. FIG. 27 is a sectional view showing a cam frame 17 in the collapsible lens barrel of the present embodiment. The lens barrel of the present embodiment is similar to that in the first embodiment except for what is described below. The same elements as those in the first embodiment are given the same reference signs, and the description thereof will be omitted.

FIG. 27 is a sectional view of the cam frame 17 taken along a plane perpendicular to the optical axis. On an outer peripheral surface of the cam frame 17, three cam grooves 18*a*, 18*b* and 18*c*, a mounting portion 17*a* for a driving gear 19, a mounting portion 17*b* for a driving actuator 6 of a second group moving frame 5 and a mounting portion 17*c* for a home position detecting sensor 25 of a second group lens L2 are provided alternately so as not to interfere with each other. When molding this cam frame 17 out of a resin, it is necessary to combine a plurality of molding die parts to make one molding die, inject a resin into cavities in the molding die and, after resin-molding, pull out each of the molding die parts in a predetermined direction so as to obtain a molded article.

Generally conceivable molding dies and molding method are as follows. Since the three cam grooves 18*a*, 18*b* and 18*c* are provided at substantially 120° intervals, three molding die parts for molding the cam grooves 18*a*, 18*b* and 18*c* respectively are used, and after the resin-molding, these molding die parts are pulled out radially in three directions of A, B and C at 120° apart. Also, three molding die parts for molding the three mounting portions 17*b*, 17*c* and 17*a* respectively are used, and after the resin-molding, these molding die parts are pulled out radially in three different directions of D, E and F. Thus, in this method, it is necessary that at least six molding die parts respectively corresponding to the three cam grooves 18*a*, 18*b* and 18*c* and the mounting portions 17*a*, 17*b* and 17*c* should be used for resin molding and then pulled out radially in six different directions, thereby molding the cam frame 17.

In the present embodiment, the directions A and F for pulling out the molding die parts are made parallel with each other, thereby molding the cam groove 18*a* and the mounting portion 17*c* of the home position detecting sensor 25 of the second group lens L2 with one molding die part. This reduces the total number of the molding die parts.

As described above, according to the second embodiment, since the number of the molding die parts can be reduced when molding the cam frame 17, it is possible to suppress the cost of molding dies. This makes it possible to reduce the cost of the collapsible lens barrel.

Although the above description has been directed to an example of molding the cam groove 18*a* and the mounting portion 17*c* with one molding die part, the present invention is not limited to this. By molding at least one of the three cam grooves 18*a*, 18*b* and 18*c* and at least one of the mounting portions 17*a*, 17*b* and 17*c* with a common molding die part, the effect described above can be obtained.

Third Embodiment

Figure 28:
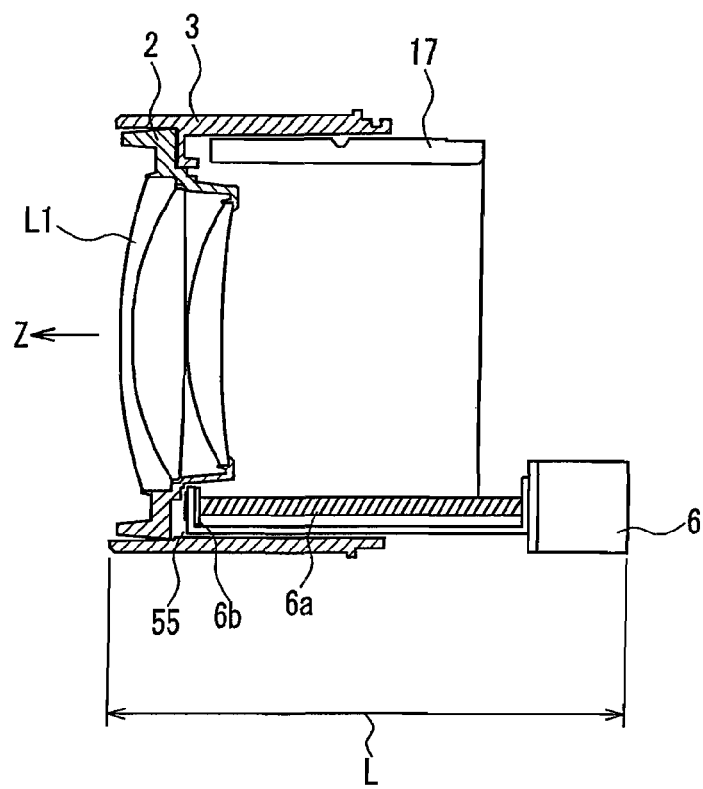
FIG. 28 is a sectional side view showing an arrangement of a front end of a second group lens driving actuator in a collapsible lens barrel according to a third embodiment of the present invention.

Next, a collapsible lens barrel in the third embodiment of the present invention will be described referring to FIG. 28. FIG. 28 is a side sectional view showing an arrangement of a front end 6*b* of a second group lens driving actuator 6 in the collapsible lens barrel according to the present embodiment. The lens barrel of the present embodiment is similar to that in the first embodiment except for what is described below. The same elements as those in the first embodiment are given the same reference signs, and the description thereof will be omitted.

FIG. 28 shows a non-capturing state similar to FIG. 22 in the first embodiment. Unlike the first embodiment, in the present embodiment, a gap 55 is provided between the first group lens L1 and the tubular first group moving frame 3 in a direction perpendicular to the optical axis, and the front end 6*b* of the second group lens driving actuator 6 enters this gap 55 in the collapsed state.

In the configuration where the front end 6*b* of the second group lens driving actuator 6 is not made to enter this gap 55, it is necessary for the second group lens driving actuator 6 to be disposed outside the first group moving frame 3 as in FIG. 22 of the first embodiment or that the second group lens driving actuator 6 should be disposed inside the first group moving frame 3 and at a position on a −Z direction side (on the side of an imaging element 14). However, in the case where the second group lens driving actuator 6 is disposed outside the first group moving frame 3, an outer diameter of the collapsible lens barrel increases. In the case where the second group lens driving actuator 6 is disposed inside the first group moving frame 3 and at the position shifted to the −Z direction side, the length L from the front end of the first group lens L1 to an end portion of the second group lens driving actuator 6 on the side of the imaging element 14 increases. As a result, the entire length of the lens barrel 1 extends in the collapsed state. In contrast, according to the present embodiment, the outer diameter and the length L can be reduced.

As described above, in accordance with the third embodiment, with the configuration in which the gap 55 is provided between the first group lens L1 and the first group moving frame 3 in the direction perpendicular to the optical axis and the front end 6b of the second group lens driving actuator 6 enters the gap 55 in the collapsed state, it becomes possible to reduce the outer diameter of the lens barrel 1 and shorten the entire length of the lens barrel 1 in the collapsed state.

Fourth Embodiment

Figure 29:
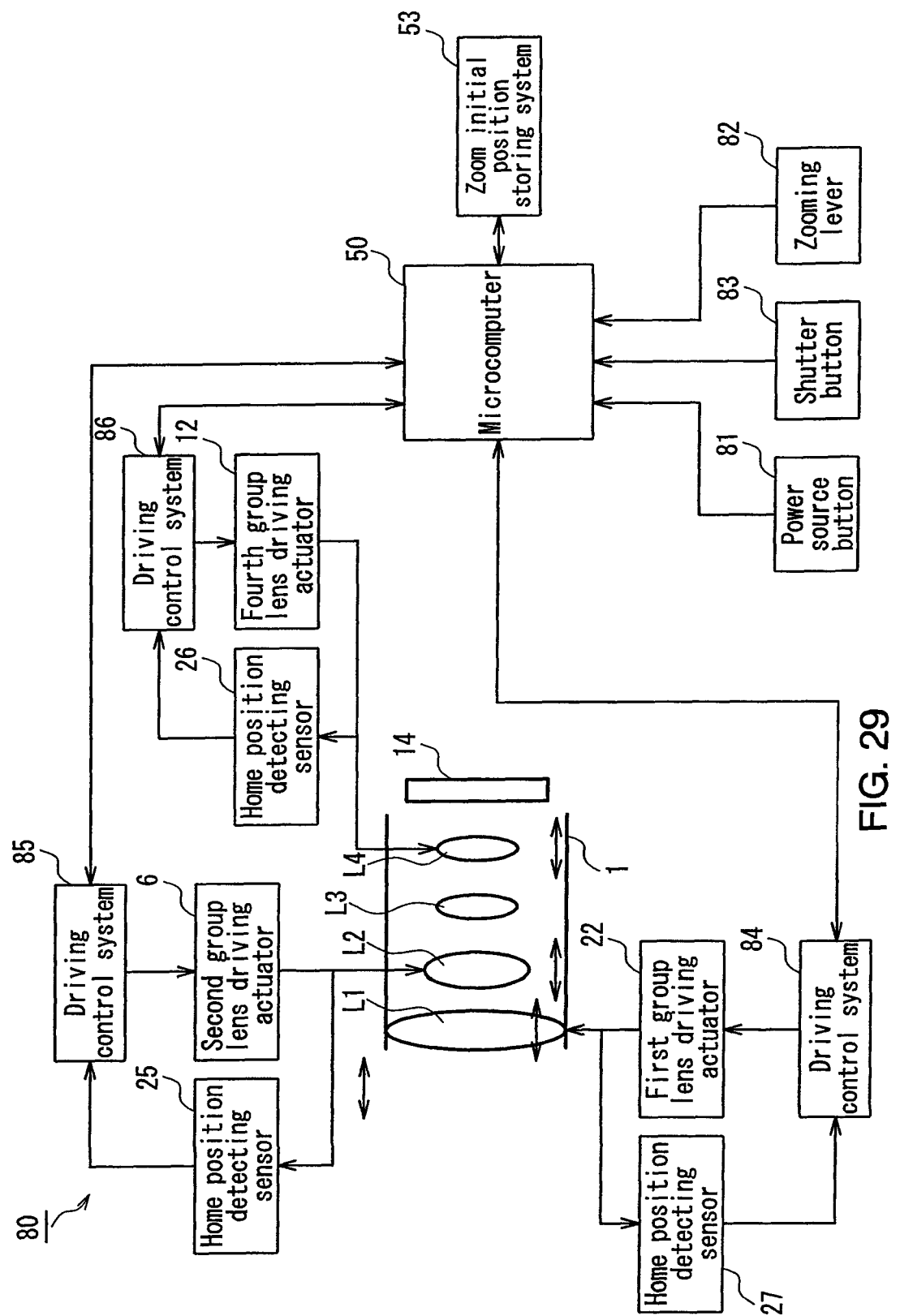
FIG. 29 is a block diagram showing a configuration of an actuator driving circuit in an optical instrument according to a fourth embodiment of the present invention.

In the following, an optical instrument using a collapsible lens barrel in the fourth embodiment of the present invention will be described referring to FIG. 29. FIG. 29 is a block diagram showing a configuration of an actuator driving circuit in the optical instrument in the present embodiment. The optical instrument of the present embodiment is similar to that in the first embodiment except for what is described below. The same elements as those in the first embodiment are given the same reference signs, and the description thereof will be omitted.

Figure 12:
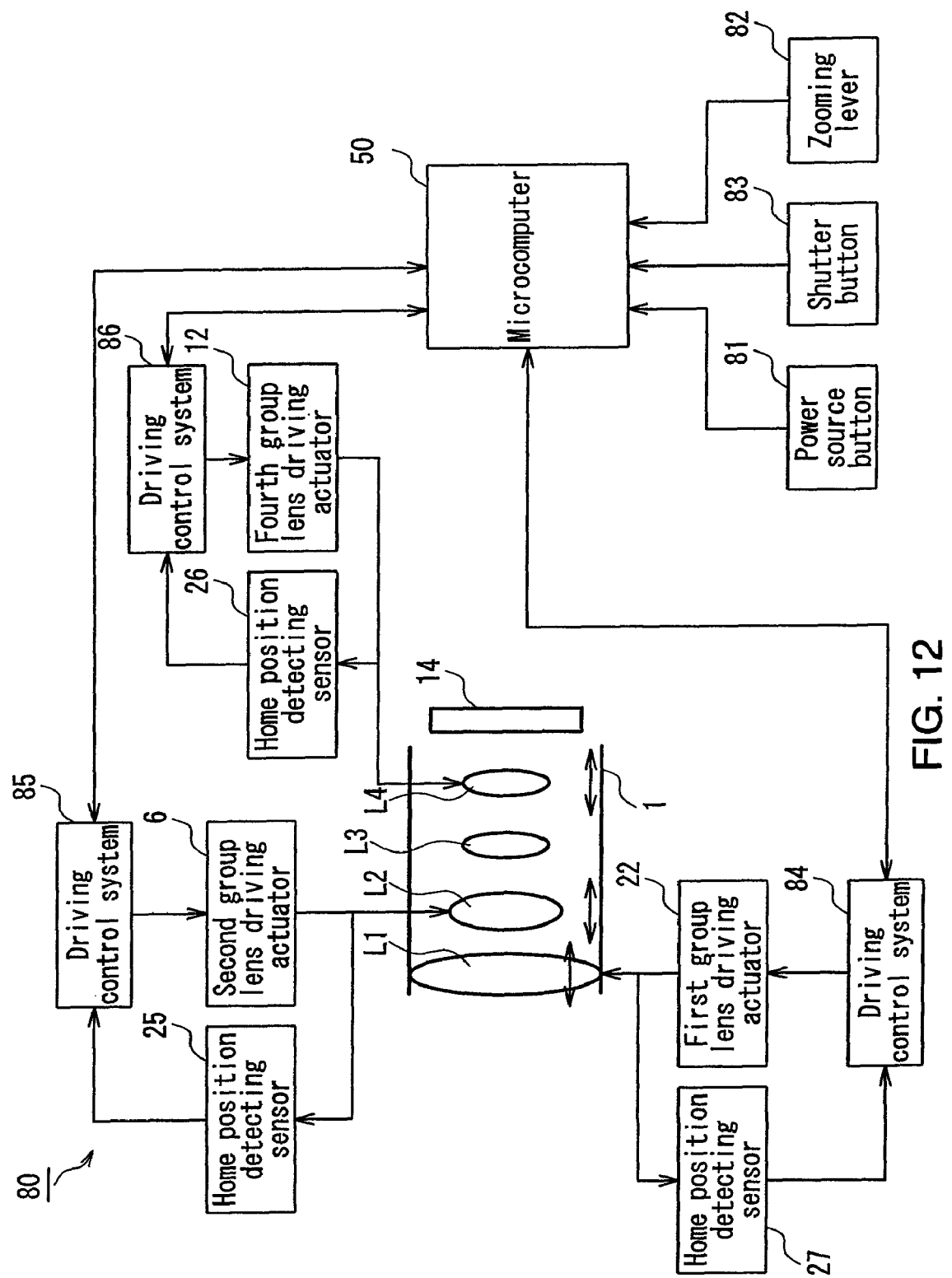
FIG. 12 is a block diagram showing a configuration of an actuator driving circuit in an optical instrument according to the first embodiment of the present invention.

The actuator driving circuit in the present embodiment shown in FIG. 29 is obtained by adding a zoom initial position storing system 53 to the actuator driving circuit in the first embodiment shown in FIG. 12. This zoom initial position storing system 53 is configured by a nonvolatile memory such as EEPROM or the like and stores as initial optical zooming factor information a zoom position immediately before turning off the power after the completion of image capturing using the DSC 80. In other words, when the power source button 81 is turned off in any of the capturing states shown in FIGS. 23, 24 and 25, the zooming position immediately before that is stored in the zoom initial position storing system 53.

Thereafter, when the power source button 81 of the DSC 80 is turned on, the first group lens driving actuator 22 for driving the first group lens L1 rotates and shifts to the state shown in FIG. 23. Next, the microcomputer 50 reads out the zooming position stored in the zoom initial position storing system 53 and, according to the read-out zoom initial position stored value, moves the second group lens L2 serving as a zooming lens to a predetermined position. For example, if the zoom initial position stored value corresponds to the state at the wide angle end, the second group moving frame 5 is moved to the state shown in FIG. 24 so as to achieve a state ready for image capturing.

As described above, according to the present embodiment, even after turning off the power of the DSC incorporating a lens ready for a high zooming factor, a set value of the zooming position before turning off is stored automatically. This is very useful for capturing images many times at the same angle of view.

It should be noted that a resetting function in which the initial value of the zooming position automatically can be set to, for example, a telephoto end when a user presses down a reset button (not shown) in the DSC also maybe provided.

Fifth Embodiment

Figure 30:
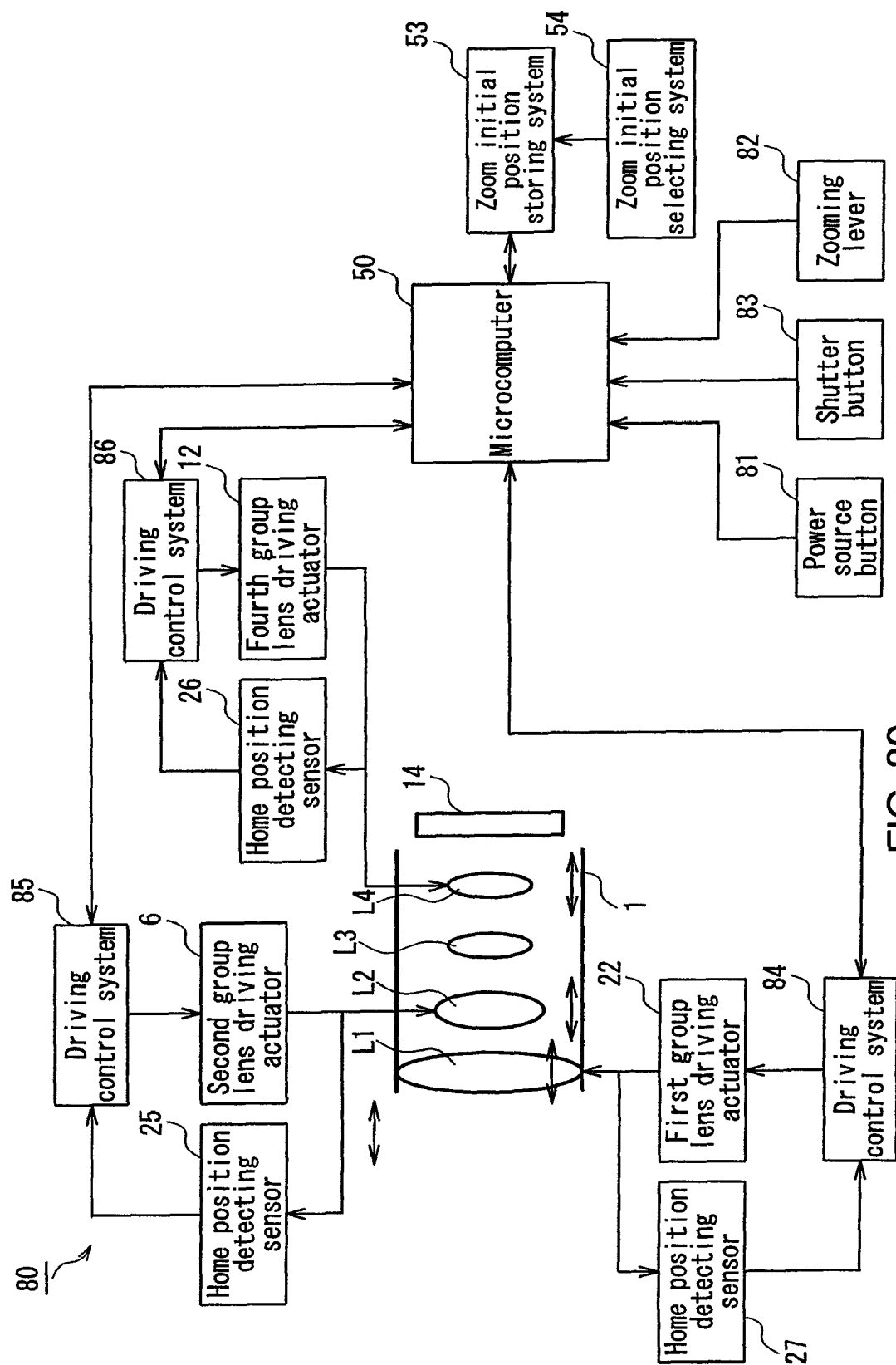
FIG. 30 is a block diagram showing a configuration of an actuator driving circuit in an optical instrument according to a fifth embodiment of the present invention.
Figure 31:
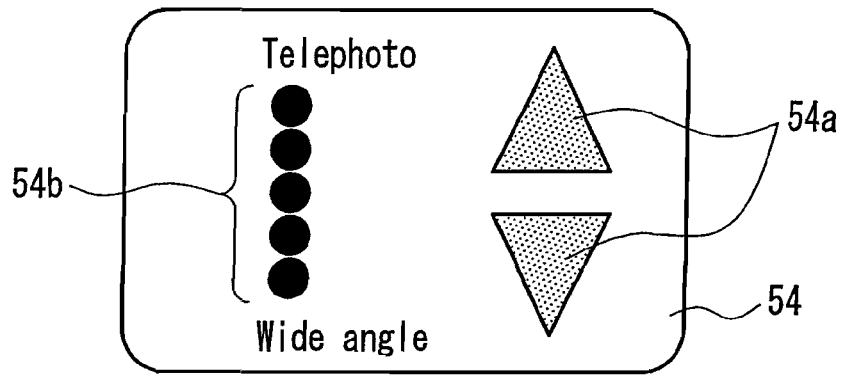
FIG. 31 is a schematic view showing an operating panel in a zoom initial position selecting system in the optical instrument according to the fifth embodiment of the present invention.

In the following, an optical instrument using a collapsible lens barrel in the fifth embodiment of the present invention will be described referring to FIG. 30 and FIG. 31. FIG. 30 is a block diagram showing a configuration of an actuator driving circuit in the optical instrument in the present embodiment, while FIG. 31 is a schematic view showing an operating panel in a zoom initial position selecting system. The optical instrument of the present embodiment is similar to that in the first embodiment except for what is described below. The same elements as those in the first embodiment are given the same reference signs, and the description thereof will be omitted.

The actuator driving circuit in the present embodiment shown in FIG. 30 is obtained by adding a zoom initial position selecting system 54 to the actuator driving circuit in the fourth embodiment shown in FIG. 29. The operating panel in the zoom initial position selecting system 54 is provided in an operating portion on an outer surface of a DSC 80 (see FIG. 14), and its external appearance includes arrow keys 54a for selecting a zooming position and a display portion 54b for displaying a current zooming position by illumination as shown in FIG. 31. A user selects a zooming position by pressing down the arrow keys 54a, thereby selecting freely the zooming positions after turning on the power. The selected zooming position is stored in the zoom initial position storing system 53 as the initial optical zooming factor information.

When the power source button 81 is pressed down to turn on the power, the first group lens L1 moves to the position shown in FIG. 23 similarly to the fourth embodiment described above. Subsequently, the microcomputer 50 reads out the zooming position of the zoom initial position storing system 53 set by the zoom initial position selecting system 54 and, based on this, the second group lens L2 moves and automatically is set to the zooming position preset by a user.

As described above, in accordance with the present embodiment, the zooming factor at the time of turning on the power can be set freely by a user, thereby making it possible to change the zooming factor depending on the scene or situation of image capturing. Consequently, it is less likely that a problem of missing a shutter chance is caused.

It should be noted that the zoom initial position to be selected may be designed to be set continuously in the range from the wide angle end to the telephoto end.

Sixth Embodiment

Figure 32:
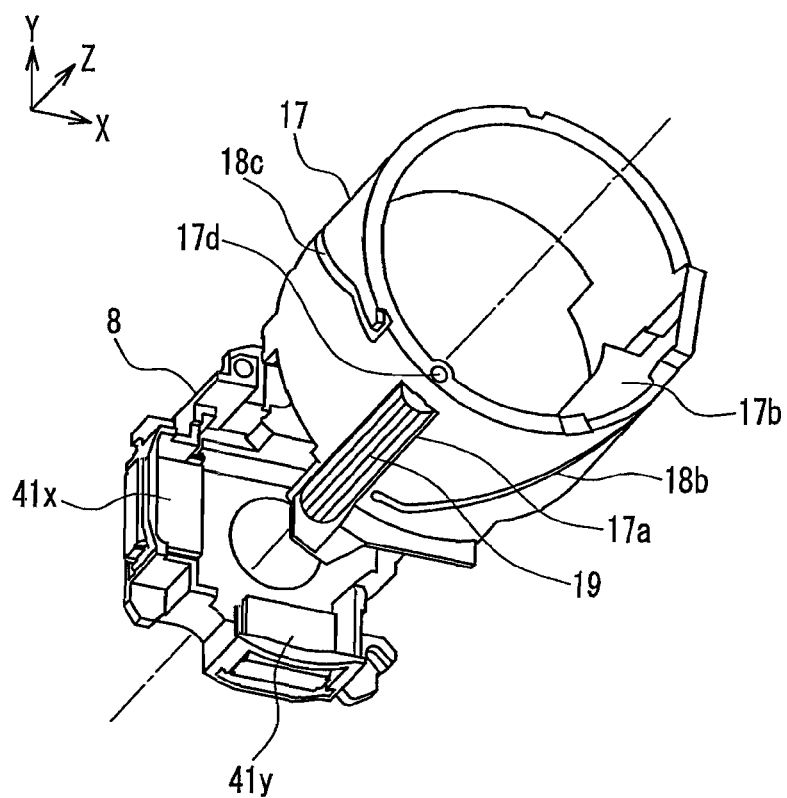
FIG. 32 is an exploded perspective view for describing the positional relationship between a driving gear and an image blurring correcting device in a collapsible lens barrel according to a sixth embodiment of the present invention.
Figure 33:
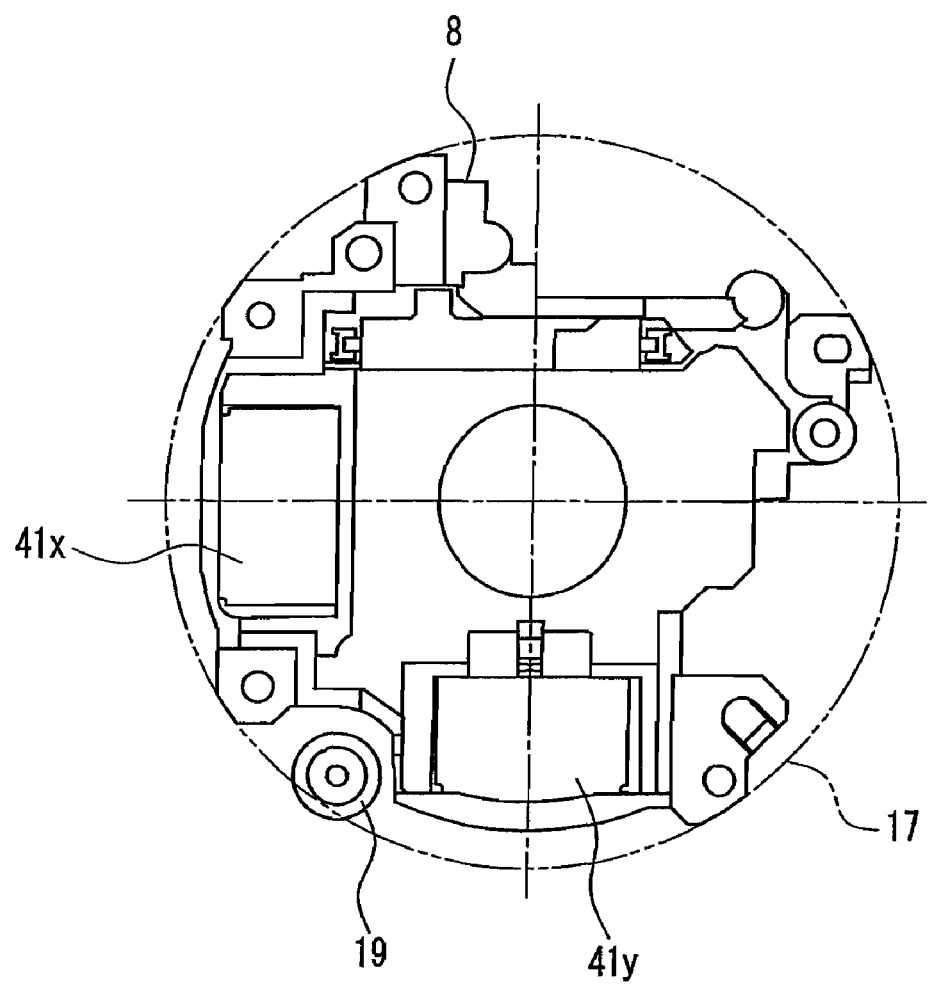
FIG. 33 is a front view seen from a direction parallel with an optical axis, showing the driving gear and the image blurring correcting device in the collapsible lens barrel according to the sixth embodiment of the present invention.

Next, a collapsible lens barrel according to the sixth embodiment of the present invention will be described with reference to FIGS. 32 and 33. FIG. 32 is an exploded perspective view for describing a positional relationship between the driving gear 19 and the image blurring correcting device 31 in the collapsible lens barrel in the present embodiment, while FIG. 33 is a front view, seen from a direction parallel with the optical axis, showing the driving gear 19 and the image blurring correcting device 31 in the collapsible lens barrel in the present embodiment. The lens barrel of the present embodiment is similar to that in the first embodiment except for what is described below. The same elements as those in the first embodiment are given the same reference signs, and the description thereof will be omitted.

Referring to FIG. 32, a mounting position of the driving gear 19 will be described.

The driving gear 19 transmits a driving force of the reduction gear unit 21 attached to the master flange 10 to the driving frame 15 and needs to have a predetermined length along the optical axis direction for the moving frame 15 to move in the optical axis direction. Also, in order to move the moving frame 15 in the optical axis direction, the cam frame 17 is provided with the cam grooves 18a, 18b and 18c, and it is necessary that the driving gear 19 should be attached to the cam frame 17 so as not to interfere with the cam grooves. Furthermore, the image blurring correcting device 31 is provided between the master flange 10 and the cam frame 17. Due to such restrictions, the driving gear 19 is disposed between the two electromagnetic actuators 41y and 41x that are placed at positions at 90° to the optical axis so as not to interfere with the image blurring correcting device 31. As a result, the cam frame 17 is provided with the driving gear 19 and further with the cam grooves 18b and 18c on both sides thereof, so that in the collapsible lens barrel 1 having the image blurring correcting device 31, the driving gear 19 can be disposed near to the center of the optical axis without causing interference between the image blurring correcting device 31 and the driving gear 19 for collapsing.

Furthermore, as shown in FIG. 33, the driving gear 19 is disposed between the two electromagnetic actuators 41y and 41x, so that the third group frame 8 on which the image blurring correcting device 31 is mounted fits substantially within a circle of the cam frame 17 indicated by a double-dashed line. Accordingly, the diameter of the collapsible lens barrel 1 can be reduced.

As described above, according to the present embodiment, by providing the driving gear 19 for collapsing between the two actuators 41y and 41x for correcting image blurring, the driving gear 19 can be brought near to the center of the optical axis without causing interference with the cam grooves. Consequently, it is possible both to shorten the entire length of the lens barrel and to reduce the diameter thereof.

Seventh Embodiment

Figure 34:
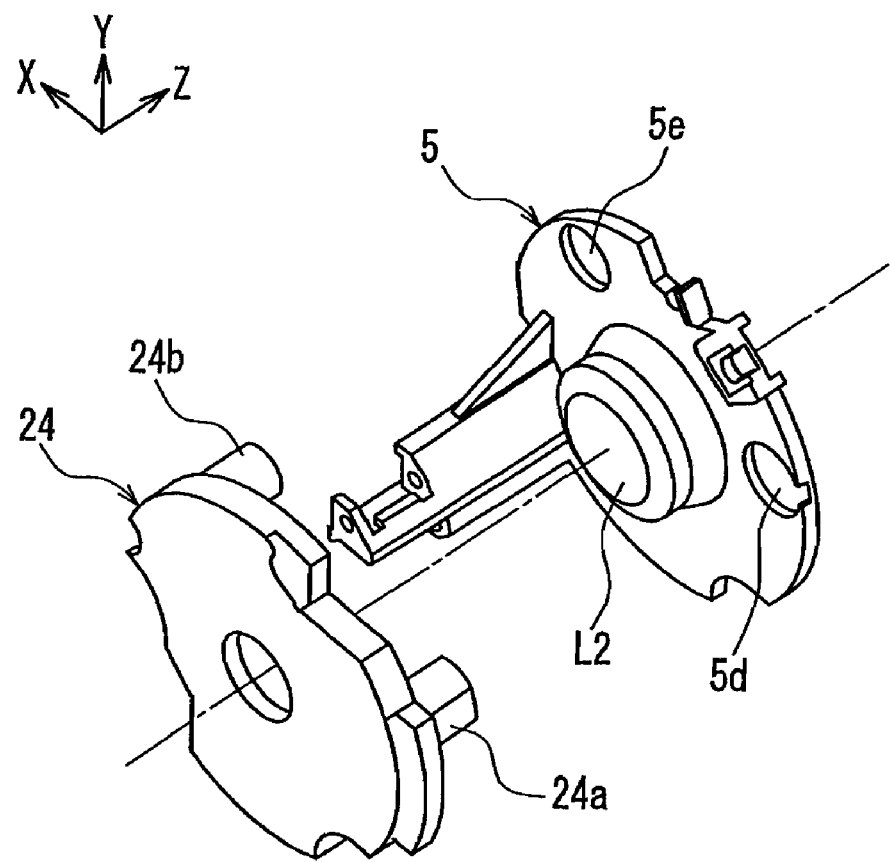
FIG. 34 is an exploded perspective view for describing the positional relationship between a shutter unit and a second group moving frame in a. collapsible lens barrel according to a seventh embodiment of the present invention.

Now, a collapsible lens barrel according to the seventh embodiment of the present invention will be described referring to FIG. 34. FIG. 34 is an exploded perspective view for describing a positional relationship between the shutter unit 24 and the second group moving frame 5 in the collapsible lens barrel in the present embodiment. The lens barrel of the present embodiment is similar to that in the first embodiment except for what is described below. The same elements as those in the first embodiment are given the same reference signs, and the description thereof will be omitted.

Referring to FIG. 34, where to place driving actuators 24a and 24b of the shutter unit 24 will be described.

The shutter unit 24 includes the diaphragm blade and the shutter blade that form a constant aperture diameter for controlling an exposure amount and an exposure time of the imaging element 14. The diaphragm blade is driven by the driving actuator 24a, and the shutter blade is driven by the driving actuator 24b. The driving actuators 24a and 24b are provided so as to protrude from the surface of the shutter unit 24 opposite to the image blurring correcting device 31, that is, the surface on the side of the second group moving frame 5. In the surface of the second group moving frame 5 on the side of the shutter unit 24, recessed portions 5d and 5e are provided at two positions corresponding to the driving actuators 24a and 24b. As a result, when the distance between the second group moving frame 5 and the shutter unit 24 decreases, the driving actuators 24a and 24b partially enter the recessed portions 5d and 5e of the second group moving frame 5, respectively, thereby preventing the interference between the driving actuators 24a and 24b and the second group moving frame 5.

Therefore, for example, when the clearance between the second group lens L2 and the image blurring correcting lens group L3 decreases at the telephoto end shown in FIG. 23, a part of the driving actuator 24a of the shutter unit 24 enters the recessed portion 5d of the second group moving frame 5.

As described above, in accordance with the present embodiment, the driving actuators 24a and 24b of the shutter unit 24 are provided on the surface of the shutter unit 24 on the side of the second group moving frame 5, and the second group moving frame 5 is provided with the recessed portions that the driving actuators 24a and 24b partially enter. This can reduce the clearance between the shutter unit 24 and the second group moving frame 5, thereby shortening the entire length of the collapsible lens barrel.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

The invention claimed is:

1. A collapsible lens barrel comprising:
a first holding frame for holding a first lens group;
a second holding frame for holding a second lens group that is disposed on an image plane side with respect to the first lens group;
an image blurring correction device for holding a third lens group for correcting an image blurring that is disposed on an image plane side with respect to the second lens group;
a first actuator for moving the first holding frame toward the object plane side at the time of capturing an image and toward the image plane side at a time of non-capturing an image;
a second actuator for moving the second holding frame in the optical axis direction; and
at least two rod-like guide members each having an end fixed to the first holding frame;
wherein the second holding frame is supported to be slidable with respect to the image blurring correcting device in the optical axis direction by the at least two rod-like guide members; and
wherein the at least two rod-like guide members are slidable with respect to the second holding frame and the image blurring correcting device in the optical axis direction upon movement of the first holding frame.

2. The collapsible lens barrel according to claim 1, further comprising a portion of a rack engaged with the second actuator and fixed to an image plane side of the second holding frame.

3. The collapsible lens barrel according to claim 1, further comprising actuators provided on the image blurring correcting device for moving the third lens group in a perpendicular direction with respect to the optical axis.

4. The collapsible lens barrel according to claim 3, wherein the actuators are disposed on a same side of an imaginary line intersecting the guide members on the image blurring correcting device.

5. The collapsible lens barrel according to claim 3, wherein the position detecting portions are disposed on a same side of an imaginary line intersecting the guide members on the image blurring correcting device.

* * * * *